US008292164B2

(12) United States Patent
Top et al.

(10) Patent No.: US 8,292,164 B2
(45) Date of Patent: Oct. 23, 2012

(54) TESTING PROTOCOLS FOR EXTENDED FUNCTIONALITY CARDS

(75) Inventors: Mustafa Top, Sun Mateo, CA (US); Edward Kurtek, Fremont, CA (US); Samantha Phillips, San Mateo, CA (US); Jan Swart, Phoenix, AZ (US); Ashish Arora, Peoria, AZ (US)

(73) Assignee: Visa U.S.A. Inc., San Francisco, CA (US)

( * ) Notice: Subject to any disclaimer, the term of this patent is extended or adjusted under 35 U.S.C. 154(b) by 503 days.

(21) Appl. No.: 12/538,353

(22) Filed: Aug. 10, 2009

(65) Prior Publication Data

US 2010/0065637 A1 Mar. 18, 2010

Related U.S. Application Data

(60) Provisional application No. 61/087,883, filed on Aug. 11, 2008.

(51) Int. Cl.
*G06K 5/00* (2006.01)

(52) U.S. Cl. ........................................................ 235/380

(58) Field of Classification Search .................. 235/380
See application file for complete search history.

(56) References Cited

U.S. PATENT DOCUMENTS

| | | | | |
|---|---|---|---|---|
| 6,072,299 | A * | 6/2000 | Kurle et al. | 320/112 |
| 2004/0022428 | A1 | 2/2004 | Chi et al. | |
| 2007/0100754 | A1 * | 5/2007 | Brown | 705/50 |

FOREIGN PATENT DOCUMENTS

| | | |
|---|---|---|
| JP | 11-353433 | 12/1999 |
| JP | 2001-155133 | 6/2001 |

* cited by examiner

*Primary Examiner* — Thien M Le
*Assistant Examiner* — Tae Kim
(74) *Attorney, Agent, or Firm* — Kilpatrick Townsend & Stockton LLP

(57) ABSTRACT

Testing is performed upon a transaction payment card having a substrate with opposing surfaces, battery powered circuit, and having memory in contact with the substrate to store data that includes an identifier for an account upon which a transaction can be conducted. An electronic component, in contact with the substrate, is powered by the battery powered circuit. In the testing, an electrical measurement is made of the battery powered circuit at each of different times when the card is exposed to an environmental condition. An output of the electrical measurements is made. The environmental condition can be temperature, current pulse applied at different states of charge of the one or more batteries, an acceleration, deceleration, or vibration for a period of time applied to card, a vacuum condition applied to the card, etc.

20 Claims, 8 Drawing Sheets

| **Criteria conditions** | **V-0** | **V-1** | **V-2** |
|---|---|---|---|
| Aferflame time for each individual specimen t1 or t 2 | ≤10s | ≤30s | ≤30s |
| Total afterflame time for any condition set (t1 plus t2 for the 5 specimens) | ≤50s | ≤250s | ≤250s |
| Afterflame plus afterglow time for each individual specimen after the second flame application (t2 & t3) | ≤30s | ≤60s | ≤60s |
| Afterflame or afterglow of any specimen up to the holding clamp | No | No | No |
| Cotton indicator ignited by framing particles or drops | No | No | No |

Figure 7

TESTING PROTOCOLS FOR EXTENDED FUNCTIONALITY CARDS

CROSS-REFERENCE TO RELATED APPLICATIONS

This application claims priority to U.S. Provisional Application Ser. No. 61/087,883, filed on Aug. 11, 2008, titled "Testing Protocols For Extended Functionality Cards,", which is incorporated herein by reference.

FIELD

The invention is related to testing of a portable consumer transaction payment device that can be used in a payment processing system in which a transaction between a merchant and a consumer conducted on an account issued by an issuer, where the transaction is acquired from the merchant by an acquirer for collection on the account from the issuer through a transaction handler or transaction processor, where the account is represented on the portable consumer transaction payment device.

BACKGROUND

Payment cards with magnetic stripe and EMV chip functions are well-known in the art. Additionally, protocols for the testing of these traditional payment cards have been developed and used by various payment card companies in order to determine their functionality, durability and usefulness. Examples of a payment card company include MasterCard, American Express, Diners Club, Discover Card, Visa Inc, etc. New extended-functionality card offerings are appearing that utilize emerging technologies such as flexible displays, enhanced smart chips, tiny lights, wafer-thin batteries, etc., to enhance the capabilities of payment cards beyond those of traditional magnetic stripe and EMV chip functions. These new cards with additional components are referred to herein as "extended-functionality cards."

While these new devices offer great opportunity to a payment card company and its members, they also introduce new challenges. Due to their enhanced components, these cards may be considered "consumer electronics" devices. As such, financial institutions, distributors, personalizers, vendors or others seeking to deploy these cards must understand how this class of new devices can benefit or impact a payment card company's branded products. Thorough testing is required to confirm the intrinsic safety and durability of the cards, as well as review for other impacts upon issuance and acceptance environments.

For example, increasing public awareness of the impacts that products and their manufacturing processes have on the environment has engendered efforts to control and mitigate these impacts. The efforts of product designers and manufacturers have focused on the life cycles of the products, from design through end-of-life stages, and have targeted changes in design, process improvements, transportation and packaging requirements, reduction of toxic material use, and pollution prevention, with the goal of ensuring sustainable product stewardship on a global scale.

In light of the above situation, there is a need for the identification of potential areas that vendors of these new extended-functionality cards should address prior to such products being allowed to issue to cardholders. To be considered for a payment card company's branding, financial institutions, suppliers and vendors, in general, should comply with the following requirements, including but not limited to:

Comply with all national and international applicable laws, regulations (including regional directives and country-specific laws), and industry standards that affect its stewardship of the products;

Review, understand, and comply with the requirements in this document;

Track relevant regulations, industry standards, and guidelines to ensure that they stay current with changing requirements;

Use only the payment card company's approved laboratories to conduct testing;

All relevant testing policies and procedures of the payment card company;

Submit documentation to the payment card company or its approved laboratories as outlined in this requirements document;

Re-evaluate compliance and submit additional documentation as appropriate should manufacturing processes or supplier of components or subassemblies change;

Provide additional documentation to the payment card company or its laboratories upon request.

If issues associated with a particular extended-functionality card is brought to the payment card company's attention by a credible source (e.g., regulatory body, non-governmental organization [NGO], or testing laboratory), it will be the payment card company's policy to investigate and review the situation, to require that modifications are made as appropriate, or to take such other action as may be appropriate.

In summary, there is a need for clearly delineated testing protocols for extended-functionality payment cards.

SUMMARY

In one implementation, testing is performed upon a portable consumer transaction payment device (PCTPD) having memory to store an identifier for an account upon which a transaction can be conducted. An electronic component in the PCTPD is battery powered. Electrical measurements are taken to gauge the effect of environmental conditions on the battery power.

BRIEF DESCRIPTION OF THE DRAWINGS

Aspects, features, benefits and advantages of the embodiments of the present invention will be apparent with regard to the following description, appended claims and accompanying drawings where:

FIG. 7 is a chart providing the UL 94 criteria for flammability classification of plastic used in devices.

DETAILED DESCRIPTION

Figure 1:
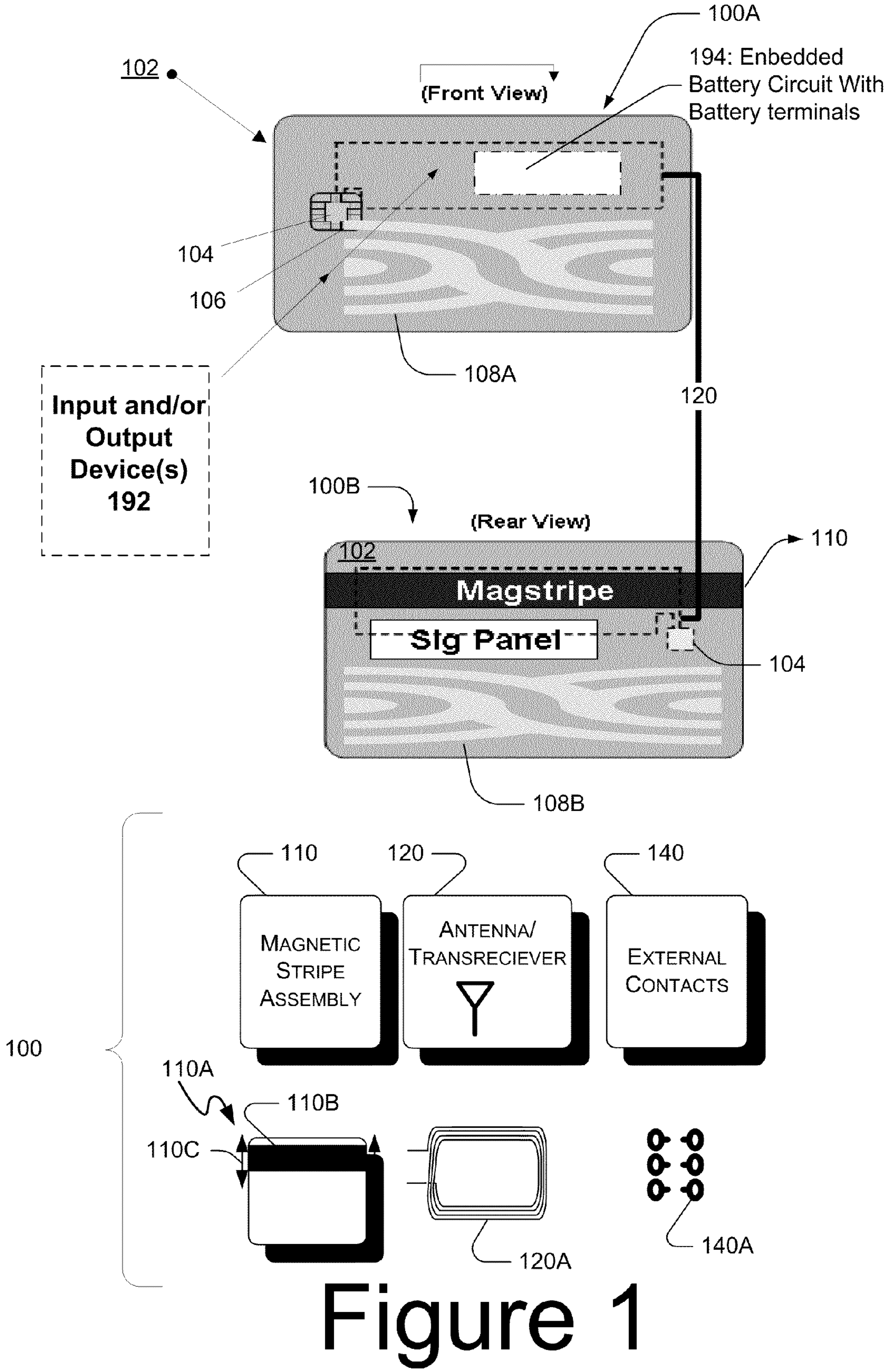
FIG. 1 illustrates exemplary implementations of a Contactless Consumer Portable Transaction Payment Device (CCPTPD)

Implementations generally relate to testing protocols for payment cards, and more specifically to providing testing protocols for extended-functionality payment cards. Implementations attempt to conform and harmonize a payment card company's products bearing its brand with industry standards and requirements in place today and in years to come.

In one implementation, a test is performed upon a portable consumer transaction payment device (PCTPD) that is an extended-functionality payment card. The PCTPD has a substrate with opposing surfaces. The PCTPD also has memory, in contact with the substrate, to store data that includes an identifier for an account issued by an issuer to an account holder for use of the PCTPD to conduct a transaction on the account to make a purchase from a merchant. A battery powered circuit is included in the PCTPD. The battery powered circuit has one or more batteries installed in a compartment within the PCTPD. An electronic component, in contact with the substrate, is powered by the battery powered circuit. In the test, when the one more batteries are installed in the compartment within the PCTPD, an electrical measurement is made of the one more batteries at each of a plurality of different times when the PCTPD is exposed to an environmental condition. An output of the electrical measurements is made. The environmental condition can be temperature, current pulse applied at different states of charge of the one or more batteries, an acceleration, deceleration, or vibration for a period of time applied to PCTPD, a vacuum condition, applied to the PCTPD, etc.

In another implementation, there is provided a PCTPD having a substrate with opposing surfaces, memory, in contact with the substrate, storing data that includes an identifier for an account issued by an issuer to an account holder for use of the PCTPD to conduct a transaction on the account to make a purchase from a merchant. A battery powered circuit having one or more batteries is installed in a compartment within the PCTPD, a display screen on the substrate is powered by the battery powered circuit. A processor, powered by the battery powered circuit, executes firmware to output information for display by rendering on the display screen. When the one more batteries are installed in the compartment within the PCTPD, an electrical measurement is taken of the one more batteries at each of different times when the PCTPD is exposed to an environmental condition. An output of the electrical measurements is made. The environmental condition can be temperature, current pulse applied at different states of charge of the one or more batteries, an acceleration, deceleration, or vibration for a period of time applied to PCTPD, a vacuum condition, applied to the PCTPD.

In yet another implementation, electrical testing is performed upon a PCTPD. The PCTPD has a substrate with opposing surfaces, memory, in contact with the substrate, storing data that includes an identifier for an account issued by an issuer to an account holder for use of the PCTPD to conduct a transaction on the account to make a purchase from a merchant. The PCTPD has a battery powered circuit having one more batteries that are at least partially situated between the opposing surfaces of the substrate, and battery terminals in electrical communication with the one or more batteries. The PCTPD has an electronic component, in contact with the substrate, powered by the battery powered circuit. The electrical testing makes a plurality of measurements, which are output, to gauge the effect of environmental conditions. The measurements include a battery capacity measurement at the battery terminals: (i) the battery capacity of the one more batteries; (ii) a pulse power capability measurement; (iii) more batteries while applying a current pulse at each of a plurality of different states of charge of the one or more batteries. The measurements also include determining an open-circuit voltage value at the battery terminals of the one more batteries before and after applications of an environmental condition to the PCTPD. Measurements are also made to predict a shelf life of the one more batteries as a function of time and capacitance to gauge the effect of varying environmental conditions. Measurements are also made of voltage and current as a function of time, at the battery terminals, of the one more batteries as the one or more batteries are discharged and short-circuited. Measurements are further made of the temperature of the one or more batteries and of the voltage, at the battery terminals, of the one more batteries as pressure is applied to the PCTPD. The measurements are output.

Introduction

The following disclosure is presented in the form of an implementation guide for various testing protocols Portable Consumer Transaction Payment Devices that are also extended-functionality payment cards, abbreviated as "PCTPD". The testing protocol prescribes procedures for measuring various electrical attributes of the PCTPD in conjunction with exposure to various environmental conditions. In various implementations, the PCTPD is battery powered. In the testing protocol, rather than removing the battery or batteries from the PCTPD to perform tests, the battery supply to the PCTPD is tested as installed in the PCTPD. Stated otherwise, battery performance specifications are tested for the PCTPD in an assembled state thereof. As such, the battery supply's electrical attributes are measured in factually accurate scenarios to actual use of the PCTPD in the field as the PCTPD is exposed to various environmental conditions.

In order for a PCTPD to be compliant with the dictated testing procedures of the implementation guide, various procedures are set forth as being mandatory in the testing protocol implementation guide. Nevertheless, a mandatory parameter, procedure, or step to establish compliance with a dictated testing procedure is not be to understood as being a critical, essential, or a required limitation of the invention.

Testing Protocol Implementation Guide for Extended-Functionality Portable Consumer Transaction Payment Device An identification is made of a payment card company's minimum required tests for extended-functionality cards, including products, parts, subassemblies, components, material composition and labeling, packaging, and transportation. Depending upon the layout, design, or capabilities of the cards, a payment card company has the option to introduce different or additional requirements. In addition, any regulatory requirements described herein are potential requirements that may be applicable to the extended-functionality card, and customers may be responsible for compliance with any additional local regulations or requirements. The payment card company will also recognize, track, and comply with all relevant global and local electronics, labeling, packaging, transportation, environmental and health and safety requirements as applicable.

In addition to completing tests as described herein, providers of extended-functionality cards will also be required to complete the traditional validations, such as consumer acceptance, card durability, and alternate suppliers. Also, all functions and features of the extended-functionality cards (e.g. displays, buttons, batteries, logic, etc.) must be tested and demonstrated to be fully operative for the entire same lifespan expected of a traditional card in the planned region and/or country of deployment (e.g. four years in countries where cards are reissued every four years), at typical rates of use. All extended-functionality cards must also comply with the payment card company's applicable product, service, technical and branding guidelines.

Implementations relate generally to testing protocols for payment cards. More specifically, the implementations provides a collection of testing protocols for extended-functionality payment cards, thereby providing conformed and harmonized methodology of aligning a payment card company's products with industry standards and requirements governing payment cards.

New extended-functionality card offerings are appearing that utilize emerging technologies such as flexible displays, enhanced smart chips, tiny lights, wafer-thin batteries, etc., to enhance the capabilities of payment cards beyond those of traditional magnetic stripe and EMV chip functions. These new cards with additional components are referred to as "extended-functionality cards". Thorough testing is required to confirm the intrinsic safety and durability of the cards, as well as review for other impacts upon issuance and acceptance environments. EMV is a standard for interoperation of IC cards ("Chip cards") and IC capable POS terminals and ATMs, for authenticating credit and debit card payments.

FIG. 1 illustrates an exemplary implementation of a Contactless Consumer Portable Transaction Payment Device (CCPTPD) that is an extended-functionality card as described above, and shows front and rear views (100A, 100B). Images may be displayed on both sides of the CCPTPD 102, with an image 108A on the front view 100A being either the same as or different from an image 108B on the rear view 100B. In this illustration, the front view 100A can also display custom indicia.

FIG. 1 also shows exemplary implementations of a data encoding area of the CCPTPD 102. The data encoding area may include an optional shielding element, which allows desired electromagnetic, optical, or radiative signals to penetrate while protecting the data encoding area from physical abuse or damage. The CCPTPD 102 may optionally have areas outside of the data encoding area shielded from physical abuse or otherwise acceptable forms of electromagnetic radiation. Some of the acceptable signals that are allowed to penetrate the shielding and may include, but are not limited to, signals accompanying a magnetic field, RFID signals, IrDA signals, visible light, invisible light, modulated laser, and/or modulated RF communication signals. By way of example and not by way of limitation, a selective shielding element may comprise a clear plastic shield, conformal coatings, an opaque plastic shield, or a clear thin film, depending on the implementation of the data encoding area.

Non-limiting examples of the data encoding area are shown at reference numeral 100, and include an antenna and/or transceiver 120 for conduct financial transactions contactlessly. Also in FIG. 1 is an exemplary implementation of the data encoding area shown as an antenna and/or transceiver 120. The antenna 120 may include commonly used loop inductors such as the one shown 120A or in those shown in related ISO standards for RF-readable smart cards. With such an interface, account data may be translated, modulated and transmitted in a manner acceptable by an RF contactless merchant POS terminal, a 802.11 Wi-Fi or WiMax network, or by a cellular or RF communications network.

An area is shown in FIG. 1 where input and/or output devices 192 can be integrated in the CCPTPD 102 and powered by an embedded battery circuit 194. A portion of input and/or output devices 192 can be upon the surface of the substrate so as to provided for user access thereto. The embedded battery circuit 194 has battery terminals (not shown) for the purpose of measurements for electrical tests performed upon one or more batteries (not shown) in a compartment (not shown) within the embedded battery circuit 194. Exemplary input/output devices include: a solar power supply circuit for receiving light and outputting electrical power to charge to one or more batteries in the embedded battery circuit 194 and/or for powering one or more other input and/or output devices. Exemplary input/output devices also include a light, a display screen for rendering visual information, an audio rendering device, or a combination of the foregoing. By way of example, but not by way of limitation the input device can be an activation button to manually input data to the CCPTPD 102, a biometric input device to input data to the card CCPTPD 102, or a combination of the foregoing.

Optionally, CCPTPD 102 may also include a magnetic stripe assembly 110 and electrical contacts 140, The magnetic stripe assembly 110 may comprise, in one implementation 110A, a reprogrammable magnetic stripe 110B that accepts data and/or commands from a processor and formats and renders that data into a form on a magnetic stripe that is readable by conventional merchant magnetic stripe-reading point of sale (POS) terminals. In this manner, the processor may program a particular account for use in a transaction as a function of user input selecting the account. Alternatively, the processor may erase the magnetic stripe of the assembly 110, rendering the card useless in the event of its loss or theft. In one implementation shown 110A, the magnetic stripe assembly 110B at least partially slidably moves 110C into and out of an assembly of the CCPTPD 102 (partial view shown), allowing the CCPTPD 102 to conduct a financial transaction at a point of sale terminal that includes a magnetic stripe reader.

External contacts 140 are yet another alternative implementation of the data encoding area shown in FIG. 1. With the CCPTPD 102 possessing physical contacts such as an array of conductive pads or shapes 140A, the CCPTPD may be placed in physical contact with a merchant's POS, and the external contacts 140 may establish connectivity to the merchant's financial processing system. The processor may relay account-related information to the merchant POS terminal through the contact interface, thereby allowing the CCPTPD 102 to be utilized with the large number of preexisting merchant POS terminals.

Regulatory and Industry Requirements of the Testing Implementation Guide

The requirements defined herein are based upon some requirements and industry standards that may be applicable to extended-functionality cards within the EU, Australia, and the US.

Vendor Requirements of the Testing Implementation Guide

All suppliers of the payment card company's-branded assembled extended-functionality cards must provide documentation demonstrating compliance with its requirements. As regulations, standards, and industry specifications change, it is incumbent on the supplier and vendor to ensure that their products are consistent with the changing requirements. The vendor is responsible for determining the applicability of and compliance with such regulations and standards to extended-functionality cards and for confirming whether any other applicable regulations and standards exist.

All vendors and suppliers of assembled extended-functionality cards shall submit documentation from the payment card company's-designated accredited laboratories to the payment card company in order to demonstrate the vendor's compliance with each of the tests cited herein in accordance with the invention. Possible documentation could include, but is not limited to:

Materials Declaration demonstrating compliance with transportation regulations and/or manifest demonstrating compliance with packaging and transport requirements:

Electromagnetic interference (EMI) and electromagnetic compatibility (EMC) certificates (e.g., CE Mark, UL certificate, C-Tick certificate);

FCC certification for Class B device;

ANSI C63.4 certification for radio-noise emissions;

Card durability certificate for ANSI INCITS 322-2002;

Card durability certificate for ISO/IEC 10373-1;

Card characteristics certificate for ISO/IEC 7810;

Test results for ASTM C1055-99 for elevated temperature impacts; and

CE mark certificate for health, safety, and product liability assessment.

The payment card company, or its laboratories, review suppliers' documentation and conformance with requirements. Should either identify a nonconformance, the payment card company would require the vendor to implement corrective action(s) within a specified timeframe and demonstrate that the action has achieved conformance.

The vendor is responsible for determining the applicability of any environmental law or regulations related to the material or finished product in the extended-functionality card, i.e., RoHS, WEEE, REACH, etc.

Should a vendor alter the manufacturing process for the assembled extended-functionality cards or implement a subassembly process change, the vendor is required to ensure that the payment card company's requirements are continually being met. It is expected that any changes in process or composition will be reflected in new documentation provided by the vendor to ensure conformance with the payment card company's requirements and the vendor is responsible for determining whether such change results in the applicability of any other applicable law, regulation or standard.

The payment card company expects each vendor to exercise due diligence and stay current with changes in regulations and standards. It is the vendor's responsibility to track changing regulations, standards, and industry specifications that directly affect materials utilized on a payment card company's branded card.

Vendors of assembled extended-functionality cards must comply with all applicable laws, regulations and standards, and require their suppliers to do the same. These standards may include, but are not limited to, battery requirements, material composition, transport, labeling, environmental and packaging of products.

Battery Performance Specifications for Assembled Cards of the Testing Implementation Guide Procedures are followed to evaluate the performance of embedded batteries in the payment card company's-branded extended-functionality cards. All vendors and suppliers of assembled extended-functionality cards that seek to issue extended-functionality cards issued with the brand, must first submit results of these tests to the payment card company or an approved laboratory of the payment card company for evaluation by or on behalf of the payment card company.

Battery Performance Testing Requirements

The following lists a series of tests to be performed on the batteries in assembled PCTPDs to determine battery capacity and shelf-life:

Capacity Measurement Test

| | |
|---|---|
| Procedure Title | Capacity Measurement Test |
| Information Needed | Battery specification sheet from the battery manufacturer<br>36 unused batteries |
| Sample Size | Test Procedure<br>The discharge capacity will be measured at 20° C., 0° C., and −20° C. for each battery type used in the card<br>Prior to discharge, the batteries will be allowed to rest at the testing temperature for no less than 1 hour and no more than 4 hours<br>The discharge capacity of the unused primary batteries will be determined at four different continuous currents. The currents will be determined by the manufacturer's rated capacity for the battery using the following equation:<br>$I_x = x * C/1$ hr<br>where Ix is the test current in mA, C is the manufacturer's rated capacity in mAh, and the value of x will be 0.02, 0.05, 0.2, and 0.5<br>Three cells will be tested for each current and temperature combination<br>The test will be terminated once the battery voltage reaches the cut-off voltage specified by the manufacturer<br>A data point should be recorded at each 1 mV change in the current controlled voltage.<br>Each data point should contain the battery voltage, duration of discharge, discharge current, and test temperature. |
| Reporting Requirements | Discharge curves in the form of battery voltage vs. discharge capacity for each test temperature. Each plot should contain the discharge curves for all discharge currents.<br>The values below also shall be included:<br>The battery capacity at:<br>−20° C. for a discharge current of 0.5 C<br>0° C. for a discharge current of 0.5 C<br>20° C. for a discharge current of 0.5 C |

Pulse Power Capability Test

| | |
|---|---|
| Procedure Title | Pulse Power Capability Test<br>Battery specification sheet from the battery |
| Information Needed manufacturer | Card electronics specification sheet providing details of the current and voltage requirements for the circuitry |
| Sample Size | 6 unused batteries |
| Test Procedure | The current pulse amplitude and pulse duration for testing will be determined from the card specifications and must include at least the following:<br>Card processing current<br>Card display startup current<br>The test will be performed on three batteries for each current<br>The current pulse will be applied for four different states of charge: 100%, 75%, 50% and 25%, respectively<br>The test equipment used must be capable of a sampling rate sufficient to capture a minimum of 20 data points within the current pulse |
| Reporting Requirements: | The pulse power capability will be calculated from the cell's internal resistance ($R_i$). The internal resistance will be determined from the following equation: |

-continued

Figure 4A:
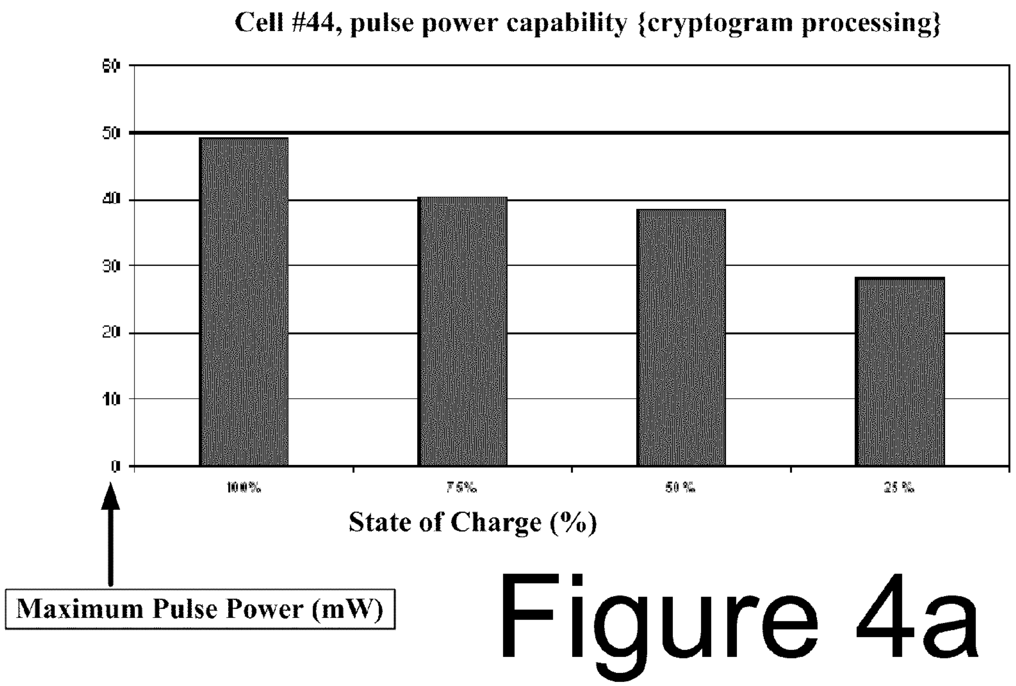
FIG. 4*a* is an example plot showing pulse power as a function of state of charge.

| Pulse Power Capability Test | |
|---|---|
| | $R_i = (V_{t0} - V_{t1})/(I_{t0} - I_{t1})$ where t0 is the time just prior to the pulse initiation and t1 is the pulse duration. The pulse power capability will be calculated from the following equation: $P_{max} = (V_{min}\ (V_{OCV} - V_{min}))/R_i$ where $P_{max}$ is the pulse power capability in milliwatts (mW), Vmin is the minimum voltage required to operate the device (i.e., the cut-off voltage) and $V_{OCV}$ is the open circuit voltage. A plot of maximum pulse power as a function of state of charge will be provided for each current mode tested. FIG. 4a shows an example plot of pulse power as a function of state of charge. |

| Shock Test | |
|---|---|
| Procedure Title | Shock Test |
| Sample Size | 5 unused batteries |
| Test Procedure | The test will be performed at an ambient temperature of 25 ± 2° C. The batteries will be subjected to a total of three shocks of equal magnitude in each of the three mutually perpendicular directions. For each shock, the battery will be accelerated in such a manner that, during the initial 3 ms, the minimum average acceleration is 75 g (where g is the local acceleration due to gravity). The peak acceleration will be between 125 g and 175 g. The open-circuit voltages of the cells will be measured before and after the test |
| Reporting Requirements | The open-circuit voltage values of the battery immediately before and after the test and the ratio between them as percentage. |

| Vibration Test | |
|---|---|
| Procedure Title | Vibration Test |
| Sample Size | 5 unused batteries |
| Test Procedure | The test will be performed at an ambient temperature of 25 ± 2° C. The assembled card will be subjected to a simple harmonic motion with an amplitude of 0.8 mm (1.6 mm total maximum excursion). The frequency of the harmonic motion will be increased and decreased at a rate of 1 Hz/min between limits of 10 Hz and 55 Hz. The card assembly will be tested in each of the three mutually perpendicular directions. The open-circuit voltages of the cells will be measured before and after the test |
| Reporting Requirements | The open-circuit voltage values of the battery immediately before and after the test and the ratio between them as percentage |

| Free-Fall Test | |
|---|---|
| Procedure Title | Free-Fall Test |
| Sample Size | 5 unused batteries |
| Test Procedure | The test will be performed at an ambient |

-continued

| Free-Fall Test | |
|---|---|
| | temperature of 20 ± 2° C. Each test sample will be dropped six times from 1.5 m onto a concrete floor The open-circuit voltages of the cells will be measured before and after the test |
| Reporting Requirements | The open-circuit voltage values of the battery immediately before and after the test and the ratio between them as percentage |

| High-Temperature Storage Test | |
|---|---|
| Procedure Title | High-Temperature Storage Test |
| Sample Size | 3 unused batteries |
| Test Procedure | In this test the batteries will be exposed to a temperature of 100° C. for 5 hours, followed by storage for 8 hours at 20° C.; a temperature of 75° C. for 48 hours, followed by storage for 8 hours at 20° C.; a temperature of 60° C. for 30 days, followed by storage for 8 hours at 20° C. The open-circuit voltages of the cells will be measured before and after the test |
| Reporting Requirements | The open-circuit voltage values of the battery immediately before and after the test and the ratio between them as percentage |

| Thermal Shock Test | |
|---|---|
| Procedure Title | Thermal Shock Test |
| Sample Size | 3 unused batteries |
| Test Procedure | In this test, the batteries will be stored at 75° C. for 48 hours, moved to a temperature of −20° C. within 5 minutes, and stored for 6 hours, followed by storage for at least 24 hours at 20° C. The open-circuit voltages of the cells will be measured before and after the test |
| Reporting Requirements | The open-circuit voltage values of the battery immediately before and after the test and the ratio between them as percentage. |

| Altitude Simulation Test | |
|---|---|
| Procedure Title | Altitude Simulation Test |
| Sample Size | 3 unused batteries |
| Test Procedure | In this test the batteries will be placed, at a temperature of 20° C., in a vacuum chamber from which the air is subsequently evacuated until the pressure is equal to or less than 11.6 kPa and held at that pressure for 6 hours The open-circuit voltages of the cells will be measured before and after the test |
| Reporting Requirements | The open-circuit voltage values of the battery immediately before and after the test and the ratio between them as percentage |

| Thermal Exposure Test | |
|---|---|
| Procedure Title | Thermal Exposure Test |
| Sample Size | 3 unused batteries |
| Test Procedure | In this test the battery will be heated in a brevity convection or circulating air oven with an initial temperature of 20° C. The temperature of the oven will be raised at a rate of 5° C. per minute to a temperature of 130° C. and remain for 30 minutes. The temperature of the oven will then be returned to 20° C. and the battery examined. |
| Reporting Requirements | Description of sample condition with photograph after test. Report any event occurred during the test such as ignition or explosion of the sample. |

| Temperature Cycling Test | |
|---|---|
| Procedure Title | Temperature Cycling Test |
| Sample Size | 3 unused batteries |
| Test Procedure | In this test, the test samples will be placed in a test chamber and subjected to the following cycles: Raising the chamber temperature to 70° C. within 30 minutes and maintaining this temperature for 4 hours; Reducing the chamber temperature to 20° C. within 30 minutes and maintaining this temperature for 2 hours; Reducing the chamber temperature to −40° C. within 30 minutes and maintaining this temperature for 4 hours; Raising the chamber temperature to 20° C. within 30 minutes; Repeating the sequence for a further 9 cycles; After the 10$^{th}$ cycle, storing the batteries for a minimum of 24 hours at a temperature of 20° C. The open-circuit voltages of the cells will be measured before and after the test. |
| Reporting Requirements | The open-circuit voltage values of the battery immediately before and after the test and the ratio between them as percentage. |

Figure 4B:
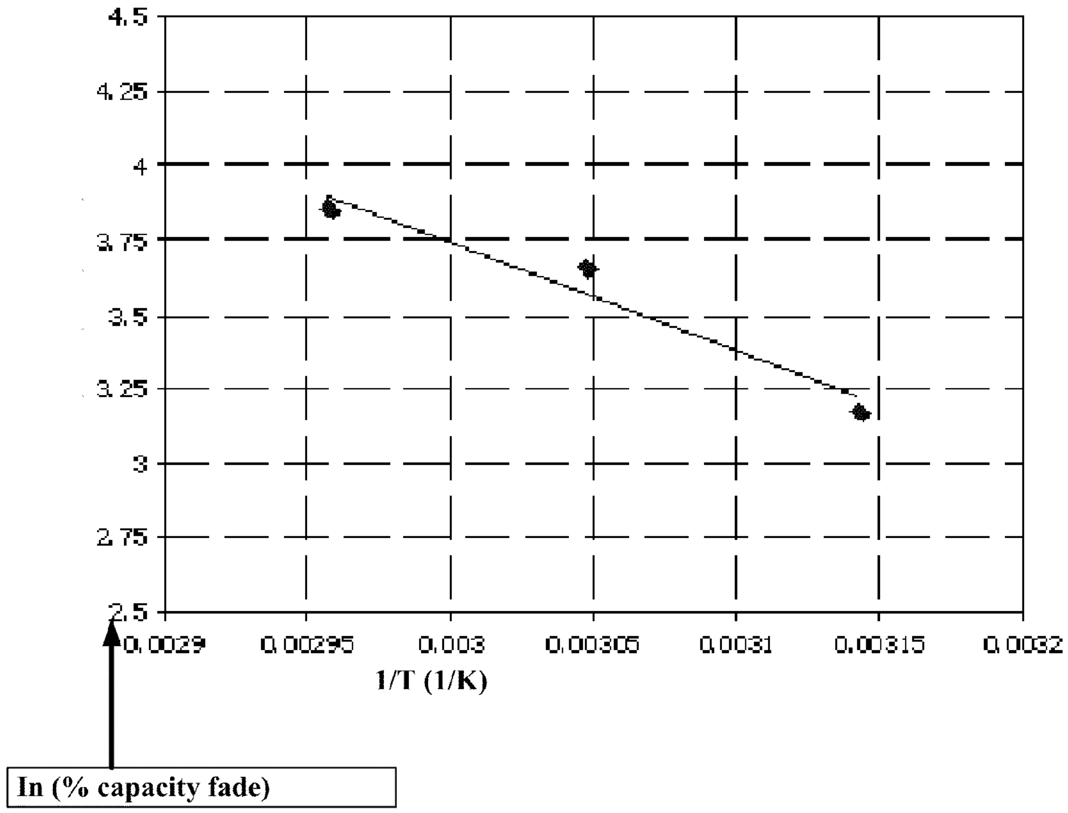
FIG. 4*b* is an example plot showing capacity fade as a function of temperature, including a best-fit line by linear regression.

| Battery Shelf-Life Test | |
|---|---|
| Procedure Title | Battery Shelf-Life Test |
| Information Needed | Battery specification sheet from the battery manufacturer Card electronics specification sheet providing details of the current and voltage requirements for the circuitry. |
| Sample Size | 40 unused primary batteries |
| Test Procedure | The batteries will be divided into 4 groups of 10 batteries each. The groups will be soaked at an ambient temperature of 25° C. (room temperature), 45° C., 55° C. and 65° C., respectively for three weeks. The battery capacity of the test samples will be determined for each group at a discharge current of 0.025 C at the end of the soak period. |
| Reporting Requirements | Average battery capacity and standard deviation for each group. The group soaked at 25° C. represents the control group, and the average battery capacity for the group is co. Average capacities for the remaining groups are C f(45), C f(55) and C f(65). A plot of the percent cell capacity fade (C) given by: $((C_o - C_{f(xx)})/C_o) * (100) = \%$ capacity fade = C versus 1/temperature (in degrees Kelvin) for each group with a linear regression fit of the data (see FIG. 4b). The capacity fade plot follows an Arrhenius relationship: $\ln C = (-E_a/R)(1/T) + \ln A$ from which the activation energy (Ea) and the pre-exponential factor (A) are to be determined (R = 8.31 J/(K * mol), T in degrees Kelvin). The slope (m) of the best-fit line prepared in the plot described above is equal to (−Ea/R); therefore: $-m(8.31) = E_a$ Rearrangement of the Arrhenius relationship and insertion of the calculated value of Ea allows determination of the value of A for each temperature: $A = C - \exp(E_a/8.31T)$ The activation energy and pre-exponential factor for each temperature will be used in the following equation, where C is % capacity fade, T is the storage temperature (in degrees Kelvin), R is the gas constant (in J/(K * mol)), and t is time in weeks: $C = A\exp(-E_a/RT)(t/3)\hat{}(1/2)$ The predicted shelf life will be calculated and plotted for the various temperature storage conditions using the above equation. FIG. 4b shows an example plot. |
| Additional Reporting Requirements | Battery shelf life as a function of temperature. Battery shelf life at 25° C. |

Card Durability

The degradation of polymers used in the card stock or other components of the extended-functionality cards must be measured and addressed. All vendors and suppliers of assembled extended-functionality cards must demonstrate compliance. The vendor is also responsible for determining the applicability of any of the laws, regulations and/or standards described below to its extended-functionality cards and for determining the applicability of any other applicable laws, regulations and/or standards, such as the following:

(a) Regulatory Bodies (i) American National Standards Institute (ANSI);

(ii) International Standards Organization (ISO).

(b) Relevant Standards (i) ANSI INCITS 322-2002—American National Standard Information Technology—Card Durability Test Methods; and (ii) ISO/IEC 10373-1: 2003-04—Identification Cards—Test Methods—Part 1: General Characteristics.

(c) Documentation Demonstrating Compliance (i) Certifications from accredited and approved laboratories; and (ii) Data reports verifying test results.

| Flexural Testing | |
|---|---|
| Procedure Title | Polymer Mechanical Test Procedures |
| Information Needed Standard | ANSI INCITS 322-2002 - American National Information Technology - Card Durability Test Methods ISO/IEC 10373-1: 2003-04 - Identification cards - Test Methods - Part 1: General Characteristics MSDS sheet for each component of assembled card A complete formulation recipe for each component Compositional information for primers, adhesives, and coatings in the assembled card Physical property data, including mechanical, electrical, and thermal properties |

-continued

| Flexural Testing | |
|---|---|
| | Engineering drawings or schematics of the card construction, to aid in disassembly of the card |
| Sample Size | 200 assembled cards with unused batteries (if applicable). Cards will be preconditioned under ISO/IEC 10373 Section 5.5 "Card dimensional stability and warpage with temperature and humidity." |
| Accelerated Testing Procedure accelerated | 100 card samples will be subjected to conditions, to evaluate storage stability per ISO/IEC 10373-1-2003 (Identification Cards - Test Methods Part 1: General Characteristics Tests) 100 samples of the assembled cards will be aged at 50° C./95% relative humidity (RH) for 24 hours ISO/IEC 10373-1: 2003-04 - Identification cards - Test Methods - Part 1: General Characteristics |
| Card Flexure | Flexure testing in accordance with ANSI INCITS 322-2002 on all four-card orientations will be performed on all test samples, to determine the expected size and position of the fatigue cracks expected after extensive card usage. |
| Reporting Requirements | Card conditions at various stages of testing, and number of cycles to failure for each test sample. Any statistical difference between the mechanical results of the: as-received and conditioned cards |

Figure 5A:
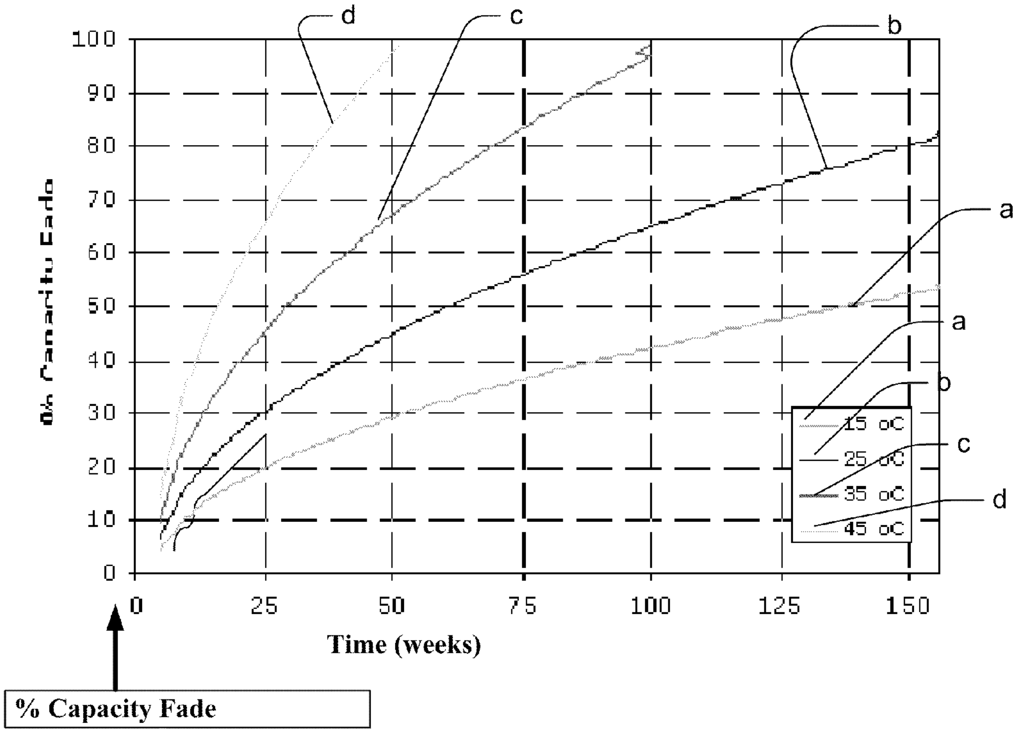
FIG. 5*a* is an example plot showing capacity fade as a function of time for various storage conditions for a prediction of shelf life via a plot for various temperature storage conditions.
Figure 5B:
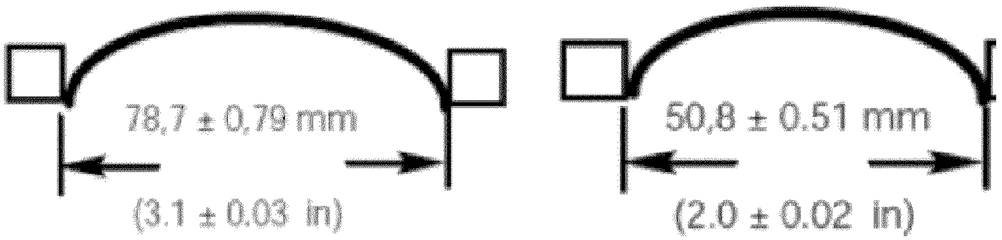
FIG. 5*b* is a diagram depicting card stress applied during a test.

| Static Stress Tests | |
|---|---|
| Procedure Title | Polymer Mechanical Test Procedures |
| Information Needed | ANSI INCITS 322-2002 - American National Information Technology - Card Durability Test Methods |
| Standard | Physical property data, including mechanical, electrical, and thermal properties. Engineering drawings or schematics of the card construction to aid in disassembly of the card. |
| Sample Size | 200 assembled cards with unused batteries (if applicable). Cards will be preconditioned under ISO/IEC 10373 Section 5.5 "Card dimensional stability and warpage with temperature and humidity." |
| Accelerated Testing Procedure | 100 card samples will be subjected to accelerated conditions, to evaluate storage stability per ISO/IEC 10373-1-2003 (Identification Cards - Test Methods Part 1: General Characteristics Tests). 100 samples of the assembled cards will be aged at 50° C./95% relative humidity (RH) for 24 hours. |
| Card Static Stress | A static stress will be applied to all cards for a determination of the card's structural integrity. The test will be performed per the test procedure defined in ANSI INCITS 322-2002. The cards will be stressed using a test fixture to achieve the stresses shown in FIG. 5. Both orientations of the cards (face up and face down) must be performed. This test should be performed on cards from each level of environmental conditioning. |
| Reporting Requirements | Card conditions at various test cycles and information on the number of cards that have fractured, their relative orientation, and whether any subcomponent (battery, display, etc) was fractured. Any statistical difference between the mechanical results of the: as-received and conditioned cards |

| Chemical Degradation Requirement | |
|---|---|
| Procedure Title | Chemical Degradation Polymeric Test Procedure |
| Needed for Test | ANSI INCITS 322-2002 - American National Information Technology - Card Durability Test Methods |
| Standard | ISO/IEC 10373-1: 2003-2004 - Identification cards - Test Methods - Part 1: General Characteristics ISO/IEC 7810: Identification Cards - Physical Characteristics MSDS sheet for each component of assembled card A complete formulation recipe for each component, to include additive packages, processing conditions, quality control measures, compliance with quality control standards, and specifications, if possible. Compositional information for primers, adhesives, and coatings in the assembled card. Physical property data, including mechanical, electrical, and thermal properties. Engineering drawings or schematics of the card construction to aid in disassembly of the card. |
| Sample Size | 10 assembled cards with unused batteries (if applicable) |
| Resistance to Chemicals | This test will determine any adverse reactions of the cards when exposed to a range of chemical contaminants. The test will be performed per the test procedure defined in ISO/IEC 10373-1: 2003-2004, with an exposure time that is 7 times the suggested value. One card will be exposed to each of the chemicals included in ISO/IEC 10373 (except salt mist and artificial saliva). Detection should be optimized by increasing the concentration in the extract by ~300%. |
| Reporting Requirements | All chemicals and quantities found in the chemical extract after the exposure will be identified. Percent recovery of those compounds will be determined. Indicate with warning if any chemical does not comply with the level requirements described in the compliance and regulations (i.e. WEEE, etc.). |

Safety, Environment and Health Standards

Tests may need to be performed to evaluate the electrical safety of the cards. The vendor is responsible for determining the applicability of any other applicable laws, regulations and/or standards.

| Low-Impedance Circuit Test (for battery-equipped cards) | |
|---|---|
| Procedure Title | Low-Impedance Circuit Test |
| Sample Size | 3 card inlays providing access to battery terminals |
| Test Procedure | The test will be performed at an ambient temperature of 25 ± 2° C. The battery will be discharged at a 3C rate using a constant-current load connected across the battery terminals. The test will be terminated once the discharge current drops below C/20 or the cell temperature stabilizes for at least 20 minutes. |
| Reporting Requirements | A plot showing the battery voltage, current, and temperature as a function of time. The data will be sampled at a rate of 1 Hz per channel. Peak battery temperature reached during the tests. Any thermal deformation or damage to the card plastic enclosure occurred during the test. |

| Short-Circuit Test (for battery-equipped cards) | |
|---|---|
| Procedure Title | Short-Circuit Test |
| Sample Size | 3 card inlays providing access to battery terminals |
| Test Procedure | The test will be performed at an ambient temperature of 25 ± 2° C.<br>A short-circuit (total resistance less than 100 mU) will be connected across the output of the battery pack. The test will be terminated once the discharge current drops below 2 mA or the cell temperature stabilizes for at least 20 minutes. |
| Reporting Requirements | A plot showing the battery voltage, current and temperature as a function of time. The data will be sampled at a rate of 1 Hz per channel.<br>Peak battery temperature reached during the tests.<br>Any thermal deformation or damage to the card plastic enclosure occurred during the test. |

| Puncture by Metallic Object Test (for battery-equipped cards) | |
|---|---|
| Procedure Title | Puncture by Metallic Object Test |
| Sample Size | 3 cards with unused primary batteries |
| Test Procedure | The test will be performed at an ambient temperature of 25 ± 2° C.<br>A nail with a diameter between 2.5 and 5 mm will penetrate the center of the battery perpendicular to its longitudinal axis (with the battery installed in the card). The nail penetration will be performed using a standard hammer. Full penetration of the nail through the cell should be achieved. |
| Reporting Requirements | Test sample photos after test.<br>Any smoldering, ignition or explosion during the test. |

| High-Temperature Discharge Test (for battery-equipped cards) | |
|---|---|
| Procedure Title | High-Temperature Discharge Test |
| Sample Size | 3 card inlays providing access to battery terminals |
| Test Procedure | The battery will be discharged at a 1.0 C rate and a temperature of 105° C.<br>The test will end when the battery voltage drops to the manufacturer-specified battery cutoff voltage. |
| Reporting Requirements | A plot showing the battery voltage, current, and temperature as a function of time. The data will be sampled at a rate of 1 Hz per channel.<br>Peak battery temperature reached during the tests.<br>Any smoke, ignition or explosion during the test. |

Figure 6A:
FIG. 6*a* is a diagram depicting a steel bar used for a dent test.
Figure 6B:
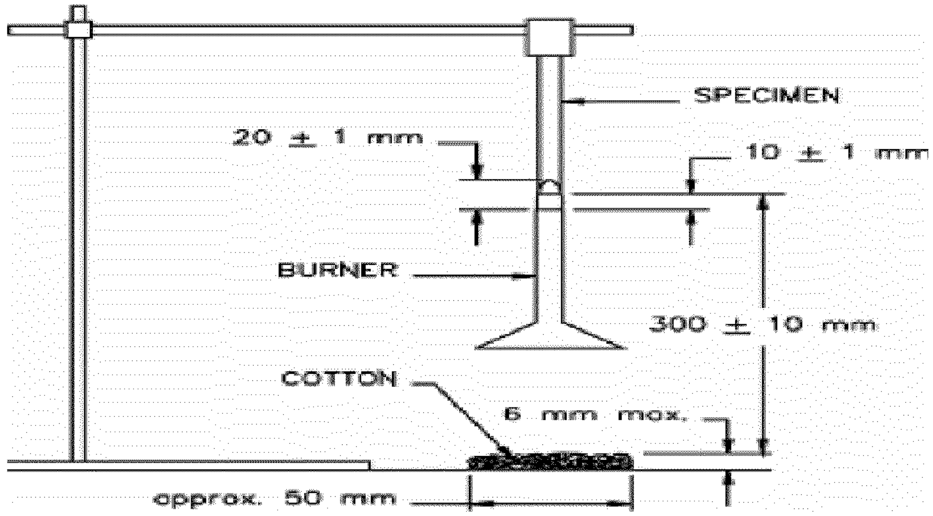
FIG. 6*b* depicts a test set-up for a vertical burn test as specified in UL94.

| Dent Test (for battery-equipped cards) | |
|---|---|
| Procedure Title | Internal Cell Failure Test Procedure |
| Sample Size | 3 cards with unused batteries |
| Test Procedure | During the test, a metal shaft will be used to "dent" the card in the location of the battery pack. The metal shaft configuration should be as shown in FIG. 6. |

-continued

| Dent Test (for battery-equipped cards) | |
|---|---|
| | A hydraulic ram will be used to control the movement of the metal shaft. If the test fixture on which the metal shaft and card are mounted is metallic, the card should be insulated from the metallic fixture so as to prevent the fixture from acting as a heat sink. The depth of the metal shaft will be adjusted so that when the hydraulic ram is fully extended, a dent is made in the card but the card enclosure is not pierced completely. The shaft will dent the card at a speed of approximately 20 cm/second. The card will be positioned in the test fixture in a manner such that the dent is made at the center of the battery. |
| Reporting Requirements | A plot showing the battery voltage and temperature as a function of time. The data will be sampled at a rate of 10 Hz.<br>Peak battery temperature reached during the tests.<br>Any smoke, ignition or explosion during the test. |

| Elevated-Temperature Storage Requirement | |
|---|---|
| Procedure Title | Elevated-Temperature Storage Test Procedure |
| Sample Size | 3 cards with unused batteries (if battery equipped) |
| Test Procedure | The cards shall be stored in a temperature-controlled chamber at a temperature of 130° C. for a period of 2 hours. |
| Reporting Requirements | Test sample photo after test.<br>Any smoke, ignition or explosion during the test. |

| Bending Test | |
|---|---|
| Procedure Title | Bending Test |
| Sample Size | 4 cards with unused batteries (if battery equipped) |
| Test Procedure | The test will be performed at an ambient temperature of 25 ± 2° C.<br>Two cards will be bent along the long axis of the card (on the centerline). This will be achieved by securing the card on this axis and bending the sample over 90° using needle-nose pliers. The bent card will be further crushed by lightly tapping with a hammer to cause creasing along the bend axis. The test will be repeated with the remaining two cards bent along the short axis of the card. |
| Reporting Requirements | Card surface temperature during test.<br>Test sample photo before and after test.<br>Any smoldering, ignition or explosion during the test. |

| Cutting Test | |
|---|---|
| Procedure Title | Cutting Test |
| Sample Size | 4 cards with unused batteries (if battery equipped) |
| Test Procedure | The test will be performed at an ambient temperature of 25 ± 2° C.<br>Two cards will be cut along the long axis of the battery (on the centerline) using scissors |

-continued

| Cutting Test | |
|---|---|
| | or snips. The test will be repeated with the remaining two cards cut along the short axis of the card. |
| Reporting Requirements | Card surface temperature during test.<br>Test sample photo before and after test.<br>Any ignition or explosion during the test. |

| Shredder Test | |
|---|---|
| Procedure Title | Shredder Test |
| Sample Size | 4 cards with unused batteries (if battery equipped) |
| Test Procedure | The test will be performed at an ambient temperature of 25 ± 2° C.<br>Ten sheets of paper will be fed into a commonly available crosscut shredder and collected in a bin before testing the card sample. The card sample will then be fed through the credit card shredding slot on the shredder and allowed to fall into the bin containing the shredded paper. |
| Reporting Requirements | Test sample photo before and after test.<br>Any smoke, ignition or explosion during the test. |

| Card Flammability Rating Test | |
|---|---|
| Procedure Title | Card Flammability Rating Test (per UL 94) |
| Sample Size | 4 cards with unused batteries (if battery equipped) |
| Test Procedure | Standard specimens of size 125 ± 5 mm long by 13 ± 0.5 mm wide will be cut from the card material and suspended vertically such that the lower end of the specimen is 300 ± 10 mm above a horizontal layer of 50 by 50 by 6 mm of 100% cotton indicator, as shown in FIG. 7. The samples will be ignited at the bottom using a burner that has been adjusted to produce a blue flame. The times for which the specimens continue to burn after the flame is removed (after-flame time) will be measured and noted. After the flaming ceases, the burner flame will be reapplied and the after-flame times measured again. The afterglow time will also be measured. Any dripping of flaming particles and their action on the cotton indicator will also be recorded. The material will then be classified according to the criteria summarized in FIG. 7 and given a flammability rating of V-0, V-1, or V-2. |
| Reporting Requirements: | Plastic flammability rating |

Review of Electro-Static Discharge (ESD) Requirements

Test cases and pass criteria will be performed by external laboratories. The test cases will assist in identifying any interruption of payment transactions caused by an extended-functionality card with un-identified components and elements as well as any potential ESD damage that could be introduced into a terminal by these technologies. Generally, any element that may indicate electrical attributes different than a plastic based conventional card plastic and stripe is considered to be an un-identified component. Such component may have these elements include, but are not limited to, card's self powering circuitry, displays, sensors, holograms or any known or unknown visual component(s) in or on the card.

The test protocols are developed to compare the cards with un-identified elements against the current standard carbon based stripe payment card of the prior art in terms of electrical attributes during an ESD event on the card. It is expected that the components on the newly projected card with the card body will perform similar to the carbon based magnetic stripe in order to conclude the verdict as "Pass".

To achieve the objective, three (3) basic set-ups are required for testing:

The ESD model and magnitude comparison via a special designed test set-up without any terminal.

The ESD magnitude and polarity comparison by utilizing a terminal head.

Determine the voltage level developed on the card when different cards are rubbed against another card, leather, nylon and cotton to get an indication of the voltage levels and polarity of different types of cards developed during normal handling.

At the conclusion of the testing, it is expected that a recommendation, in terms of ESD event occurrence for new developed card with the un-identified components when compared against the current carbon based magnetic stripe, can be made having equal/similar performance.

The following standards should be referenced:

IEC 6 1000-4-2 (Person holding a tool—150 pf/330 Ohms);

ANSI/ESD STM5.1-2001 (Human Body Model—100 pf/1500 Ohms);

ANSI/ESD STM5.2-1999 (Machine Model—200 pf/0 Ohms);

ANSI/ESD STM 5.3 (Charged Device Model—Stripe capacitance/0 Ohms).

The carbon-based stripe is taken as the reference point to compare the new component in some of these tests. If the new component indicates the same electrical attributes in terms of an ESD event, a correlation can be made that the new developed card being considered is not expected to cause any ESD interruptive event during a transaction.

The detailed user functions and features of the sample cards for testing shall be explained along with the required documents for an operator to verify these functionalities during the test. These are including, but not limited to, (if present in the card): buttons; screens; the screen content; the sound component; in what conditions the sound gets activated; how to use buttons and for what functions.

Following are the test bench components and requirements:

Conventional magnetic stripe cards; New developed Battery-Powered Smart Cards samples. Minimum two (2) per each configuration; Disassembled read heads (One or two extra for spares); ESD simulator HBM, MM, CDM and IEC networks; High voltage charging source to 10 kV, limited to 100 μA at 10 kV; Corona Charging apparatus; Nanocoulombmeter and Faraday Cup; Humidity controlled room or other equipment where the terminal and card will be tested; Humidity meter and thermometer;

A grounding probe with a proper grounding based on associated standards; Oscilloscope and equivalent device to capture current and voltage wave in nanosecond scale; Proper connection system between the wave capturing device and the ESD current line (ground), i.e. Transduce.

The cards and terminal shall be conditioned in an environment with 12% relative humidity for a minimum of 24 hours with enforced air prior to performing test.

The laboratory will perform the test as explained in test procedures for each of the card products. The laboratory will create a table for each device product confirming the test results for each card type as indicated following tests.

The report provided by the laboratory shall have a template as explained below:

Section 1—Executive summary of the results—This is a high level overview of the test performed and the test result recommendation that will allow non-technical business groups to review and have a basic understanding of the testing, and results. It will conclude with a recommendation from a laboratory point of view on potential risks of the product in the field in terms of ESD and any found issues.

Section 2—Detailed explanation and analysis of the test results.

Section 3—Includes tables of test results including a representative sampling of similar captured waveforms.

Section 4—Summary and recommendations on further testing and product risk factors in terms of ESD events in the field.

Test Zones to be used in Testing Zone 1

Card Measurements

This zone identifies the unsafe area of the card that magnetic stripe reader head contacts directly with normal and upside-down swipes. This zone is considered to cover also from a person finger touches the card and the other edge of the card enters in to the reader. Therefore the measurements shall be made between the points, 0.5 cm inner from the card short edge and 1 cm inner from the long edge for both, front and back.

Zone 2—On Component Measurements (Conditional)

Between 2 points as 0.5 cm inner from the short edges of the all components that occupies the unsafe zone of the card. One test per component is required in related tests.

This zone applies only if the card contains a component such as metal material based security element for both surfaces, front and back.

Pass Criteria Restrictions

No disruption on the sample ESD sensitive terminals that are provided to the laboratory during the charge and swipe tests.

The cards under test shall be functional after all ESD susceptibility related tests. Functions of all the visual components as well as the enabled transaction interfaces, contact, contactless etc. shall be verified after test completed based on the vendor conformance statement and product information.

Test Cases

Test Name: ESDG2 001 Waveform and Magnitude with Dielectric Breakdown: ESDG2 001

| | |
|---|---|
| Test No | |
| Objective | High voltage conductivity comparison and equivalency between<br>Carbon Based Stripe (CBS) and sample card. |
| Reference | ESD 5.1 |
| Test devices | Relative Humidity meter and thermometer<br>ESD simulator configured to HBM (Human Body Model) with adjustable voltage level.<br>Grounding probe<br>Oscilloscope or other equivalent device to capture and record the waveform in a nanosecond scale. The wave will be recorded for current at nanosecond level indicating the discharge. |
| Configuration | 2 CBS cards (as reference card for pass criteria)<br>2 new developed card sample for each design |
| Conditions | Test environment relative humidity: 20% or lower Cards are stored in 12% RH for minimum 24 hours under enforced air around the cards.<br>Test personnel must stand on insulative substrate (Teflon, Plexiglas or Poly Ethylene Foam) to prevent grounding<br>No cell phone shall be located around the test bench |

-continued

Test Name: ESDG2 001 Waveform and Magnitude with Dielectric Breakdown: ESDG2 001

Procedures

1. Record RH and temperature during the test.
2. Put the card on an insulated surface with one stripe edge touching the grounding probe in complete contact at 0.5 cm from the end of the edge.
3. Configure the ESD simulator to Human Body Model with an initial voltage level at 500 Volt
4. Discharge the ESD simulator on discharge point.
5. Examine any discharge (current occurrence) on the ground line. If any current or discharge observed note the configured voltage level$_{VESD}$ and record the peak current and wave shape and skip next step.

Repeat steps 4 to 5 with incremental voltage levels of 1,000, 5,000, 10,000, 15,000 and 20,000 V.

Note:

Conduct the test only once per card. Do Not perform repetitive measurements Reconfigure test set up and wait at least two (2) minutes before retesting the card Repeat the test for each card sample Conditional test repetition: Repeat the test for the Zone 2 per a component that occupies the unsafe zone partly or fully.

| | |
|---|---|
| Payment Card Co. | VESD of the sample card ~VESD of the carbon based card |
| Requirement: | No significant difference between the discharge shape of CS card and test card |

| Relative Humidity (%) - Temperature (C.) - | Carbon Stripe (CS) | Card Under Test Sample 1 | Card Under Test Sample 2 | Card Under Test Sample 3 |
|---|---|---|---|---|
| VESD (kV) | | | | |
| Verdict | | | | |
| Comment | | | | |

Result Table 1 (Above)

Test Name - ESDG2 003A Waveform and Magnitude Conductivity

| | |
|---|---|
| Test No | ESDG2_003A |
| Objective | Measure Dynamic Resistance of stripe and compare between<br>Carbon Based Stripe (CBS) and Sample card |
| Reference | ESD 5.1, 5.2 |
| Test devices | Relative Humidity meter and thermometer<br>ESD simulator configured to HBM @ 100 pf/1500 Ohms and 100 pf/0 Ohms (Human Body Model) with adjustable voltage level<br>Grounding probe<br>Oscilloscope or other equivalent device to capture and record the waveform in a nanosecond scale. The wave will be recorded for current at nanosecond level indicating the discharge |
| Configuration | 2 CBS cards (as reference card for pass criteria)<br>2 new developed card sample for each design |
| Conditions | Test environment relative humidity: 20% or lower<br>Cards are stored in 12% RH for minimum 24 hours under enforced air around the cards<br>Test personnel must stand on insulative substrate (Teflon, Plexiglas or Poly Ethylene Foam) to prevent grounding<br>No cell phone shall be located around the test bench |

Procedures

Record RH and temperature during the test

Put the card on an insulative surface with one stripe edge touching the grounding probe in a complete contact at the edge.

Configure the ESD simulator to Human Body Model with a voltage level of 5000 Volts -continued

| Test Name - ESDG2 003A Waveform and Magnitude Conductivity |
|---|
| Discharge the ESD simulator once to edge from the end of a stripe<br>Measure the discharge current observed. Record the peak current and wave shape.<br>Repeat the test for each card sample.<br>Repeat the test using R = 0 Ohms<br>Calculate the Dynamic Resistance, RD by dividing 5000 by the measured current in Amps. Complete data sheet with results and comments for each test<br>Payment Card Co. Requirement: RD of the sample card >1 kO; No significant difference between the discharge shape of carbon based magnetic stripe card and test card |

RESULT TABLE 2

| Relative Humidity (%) - Temperature (C.) - | Pass Criteria | Card Under Test Sample 1 | Card Under Test Sample 2 | Card Under Test Sample 3 |
|---|---|---|---|---|
| RD | >1 kO | | | |
| Verdict | | | | |
| Comment | | | | |

Result Table 2 (Above)

Test Name - ESDG2 004A ESD on a Grounded Reader Head: Test No ESDG2 004A

| | |
|---|---|
| Objective | High voltage conductivity comparison and equivalency between Carbon Based Stripe (CBS) and sample card. |
| Reference | |
| Test devices | Relative Humidity meter and thermometer<br>High voltage power supply with adjustable voltage level to ±10 kV, limited to 100Ʒa at 10 kV<br>Disassembled and grounded reader head<br>Oscilloscope or other equivalent device to capture and record the waveform in a nanosecond scale. The wave will be recorded for current at nanosecond level indicating the discharge |
| Configuration | 2 CBS cards (as reference card for pass criteria)<br>2 new developed card sample for each design |
| Conditions: | Test environment relative humidity: 20% or lower<br>Cards are stored in 12% RH for minimum 24 hours under enforced air around the cards<br>Test personnel must stand on insulative substrate (Teflon, Plexiglas or Poly Ethylene Foam) to prevent grounding<br>No cell phone shall be located around the test bench |
| Procedures | |

Record RH and temperature during the test
Configure the HVPS with a voltage level at 1250 Volts
Touch the edge and surface of the card to the discharge probe (a read head) of the test fixture. Examine any discharge (current occurrence) on the ground line.
If any current or discharge is observed on the ground line record the peak current Ip and wave shape (1) and (2) on read head output connection$_{VESD1}$ (Measurement point 1) during the discharge and skip next step. Only one pin needs to be tested since the discharge will be to the shell of the read head and be induced equally to all pins.
Repeat the test at least 3 more times.
Ionize card between measurements.
Repeat the test for each card sample.
Complete data sheet with results and comments for each repetition.

| | |
|---|---|
| Payment Card Company Requirement: | VESD1 of the sample card ~VESD1 of the carbon based card<br>Ip ~5000 mA<br>No significant difference between the discharge current waveforms, (1) and (2), of carbon based magnetic stripe card and test cards |

Test Name - ESDG2 005A Dielectric Breakdown

| | |
|---|---|
| Test No | ESDG2_005A |
| Objective | High voltage conductivity comparison and equivalency between Carbon Based Stripe (CBS) and sample card. |
| Reference | |
| Test devices | Magnetic Stripe Reader and Terminal<br>Relative Humidity meter and thermometer<br>High Voltage Power Supply with adjustable voltage level to ±10 kV, current limited to 100ua at 10 kV. |
| Configuration | 2 CBS cards (as reference card for pass criteria)<br>2 new developed card sample for each design |
| Conditions | Test environment relative humidity: 20% or lower<br>Cards are stored in 12% RH for minimum 24 hours under enforced air around the cards and terminals<br>Test personnel must stand on insulative substrate (Teflon, Plexiglas or Poly Ethylene Foam) to prevent grounding<br>No cell phone shall be located around the test bench |
| Procedures | |

1. Record RH and temperature during the test.
2. Configure the HVPS with an initial voltage level at −500 Volts.
3. Touch the edge and surface of the card to the discharge probe (a read head) of the test fixture. Examine any discharge (current occurrence) on the ground line.
4. Examine terminal to determine if reboot or reinitiating or frozen or any other abnormality observed. If any of these abnormalities observed note the configured voltage level VDisruption and skip to step 7.
Note:
In case of any abnormality observed do not increase the voltage and do not continue step 6. This may damage the terminal.
5. Repeat steps 3 and 4 with incremental voltage levels of −750, −1000, 750, 1000, 1250, 1500, 2000, 5000, and 10,000 V or up to disruption with 250 V incremental values.
6. Repeat the test at least 3 more times.
7. Ionize card between measurements.
8. Repeat the test for each card sample.
9. Repeat the test for each “new component” in unsafe zone in a position that the component in contact (touches) with the terminal head.
10. Complete the data sheet with results and comments for each repetition.

| | |
|---|---|
| Payment Card Co. Requirement | V(disruption) of the sample card ~V(disruption) of the carbon based magnetic stripe card |

RESULT TABLE 3

| Relative Humidity (%) Í Temperature (C.) Í | Carbon Stripe (CS) | Card Under Test Sample 1 | Card Under Test Sample 2 | Card Under Test Sample 3 |
|---|---|---|---|---|
| V (disruption) | | | | |
| Verdict | | | | |
| Comment | | | | |

Result Table 3 (Above)

Test Name - ESDG2 010 Card Charging Level Test No. ESDG2 010

| | |
|---|---|
| Objective | Determine how different cards charge and their maximum magnitude polarity when handled in typical fashion like removing from wallet between Carbon Based Stripe (CBS) and sample card. |
| Reference | |
| Test devices | Magnetic Stripe Reader and Terminal<br>Relative humidity meter and thermometer<br>Leather, nylon, other cards, cotton cloth<br>Static charge meter or nanocoulombmeter and Faraday cup |

-continued

| Test Name - ESDG2 010 Card Charging Level Test No. ESDG2 010 | |
|---|---|
| Configuration | 2 CBS cards (as reference card for pass criteria)<br>2 new developed card sample for each design |
| Conditions | Test environment relative humidity: 20% or lower<br>Cards are stored in 12% RH for minimum 24 hours under enforced air around the cards<br>Test personnel must stand on insulative substrate (Teflon, Plexiglas or Poly Ethylene Foam) to prevent grounding<br>No cell phone shall be located around the test bench |
| Procedures | |

Record RH and temperature during the test
Charge the card by rubbing it against another card, leather and nylon surfaces
Slowly swipe the card on the terminal
Examine terminal to determine if reboot or reinitiating or frozen or any other abnormality observed
Ionize card between measurements
Repeat the test at least 3 more times
Repeat the test for each card sample
Complete the data sheet with results and comments for each repetition
At point of reboot, repeat measurement and record waveform.

| | |
|---|---|
| Payment Card Co. Requirement | No abnormality observed on the reader |

| Test Name - ESDG2 012 Card Charging Level Test No. ESDG2 012 | |
|---|---|
| Objective | Determine how different cards charge and their maximum magnitude polarity when handled in typical fashion like removing from wallet between Carbon Based Stripe (CBS) and sample card. |
| Reference | |
| Test devices | Magnetic Stripe Reader and Terminal<br>Relative humidity meter and thermometer<br>Leather, nylon, other cards and cotton cloth<br>Static charge meter or nanocoulomb meter and Faraday cup |
| Configuration | 2 CBS cards (as reference card for pass criteria)<br>2 new developed card sample for each design |
| Conditions | Test environment relative humidity: 20% or lower<br>Cards are stored in 12% RH for minimum 24 hours under enforced air around the cards<br>Test personnel must stand on insulative substrate (Teflon, Plexiglas or Poly Ethylene Foam) to prevent grounding<br>No cell phone shall be located around the test bench |
| Procedures | |

Record RH and temperature during the test
Charge the card by rubbing it against another card, leather and nylon wallet surfaces
Slowly swipe to the simulated Reader Head (connected to the scope)
Capture discharge waveforms
Record discharge peak current Ip of each trial
Repeat the test at least 3 more times
Repeat the test for each card sample
Complete the data sheet with results and comments for each repetition

| | |
|---|---|
| Payment Card Co. Requirement | Ip of the sample card ~Ip of the carbon based magnetic stripe card |

RESULT TABLE 4

| Relative Humidity (%) 1́ Temperature (C.) 1́ | Carbon Stripe (CS) | Card Under Test Sample 1 | Card Under Test Sample 2 | Card Under Test Sample 3 |
|---|---|---|---|---|
| Ip | | | | |
| Verdict | | | | |
| Comment | | | | |

Result Table 4 (Above)

| Test Name - ESDG2 013 Card Capacitance and Discharge Energy Test No ESDG2 013 | |
|---|---|
| Objective | Determine capacitance between Carbon Based Stripe (CBS) and sample card Reference |
| Test devices | Capacitance meter with resolution of 0.1 pf<br>Relative humidity meter and thermometer |
| Configuration | 2 CBS cards (as reference card for pass criteria)<br>2 new developed card sample for each design |
| Conditions | Test environment relative humidity: 20% or lower<br>Cards are stored in 12% RH for minimum 24 hours under enforced air around the cards<br>Test personnel must stand on insulative substrate (Teflon, Plexiglas or Poly Ethylene Foam) to prevent grounding<br>No cell phone shall be located around the test bench |
| Procedures | |

Record RH and temperature during the test
Place the non-stripe side of the card (front) on a flat metal surface.
Zero the Capacitance meter. Then connect the Capacitance meter to the plate and to the stripe or section of stripe to be measured.
Measure the capacitance
Repeat the test for each card sample
Record the measurements on the data sheet
Calculate Discharge Energy, E = ½CV2, or E = 12.5 × 106 C

| | |
|---|---|
| Payment Card Co. Requirement | Capacitance ~1.0pf<br>Calculated Discharge Energy ~12.5 ƷJ |

RESULT TABLE 5

| Relative Humidity (%) 1́ Temperature (C.) 1́ | Carbon Stripe (CS) | Card Under Test Sample 1 | Card Under Test Sample 2 | Card Under Test Sample 3 |
|---|---|---|---|---|
| Capacitance | 1.0 pf | | | |
| Energy | 12.5 ƷJ | | | |
| Verdict | | | | |
| Comment | | | | |

Result Table 5 (Above)

| Test Name - ESDG2 014 Card ESD Susceptibility Test No. ESDG2 014 | |
|---|---|
| Objective | Ensure card functions properly after ESD exposure |
| Reference | ESD 5.1 |
| Test devices | Relative Humidity meter and thermometer<br>ESD simulator configured to HBM (Human Body Model) with adjustable voltage level<br>Grounding probe<br>Oscilloscope or other equivalent device to capture and record the waveform in a nanosecond scale. The wave will be recorded for current at nanosecond level indicating the discharge. |
| Configuration | 2 CBS cards (as reference card for pass criteria)<br>2 new developed card sample for each design |
| Conditions | Test environment relative humidity: 20% or lower<br>Cards are stored in 12% RH for minimum 24 hours under enforced air around the cards<br>Test personnel must stand on insulative substrate (Teflon, Plexiglas or Poly Ethylene Foam) to prevent grounding<br>No cell phone shall be located around the test bench |

-continued

| Test Name - ESDG2 014 Card ESD Susceptibility<br>Test No. ESDG2 014 | |
|---|---|
| Procedures | |
| 1. Record RH and temperature during the test<br>2. Put the card on a grounded conductive (metal) plate<br>3. Configure the ESD simulator to Human Body Model with an initialvoltage level at 500 Volt<br>4. Discharge the ESD simulator to the center (+/−3 mm) of a plurality of locations<br>5. Review the all card functions for operability between each location tested. If any abnormality or malfunctioning of any card component observed: note the voltage$_{VESD}$ and location for applied voltage and STOP TESTING at this point.<br>6. Repeat steps 4 to 5 with incremental voltage levels of 1000, 5000, 10,000 V<br>7. Repeat above but: insert the card on an insulative layer; start initial voltage with 10,000 V; with incremental voltage levels 15,000 and 20,000 V<br>8. Repeat the test for each card sample<br>9. Complete the data sheet with results and comments for each repetition | |
| Payment Card Co. Req. | No abnormality on card functions on metal surface up to 10 kV<br>No abnormality on card functions on insulative surface up to 20 kV |

Other Requirements

Functional Component Requirements

The payment card company may develop additional testing requirements related to functional components on extended-functionality cards. Examples of such components may include, but are not limited to: Displays; Activation or input buttons; Biometric input devices; Novelty lights or sounds; and Others.

Payment Processing System

Figure 2:
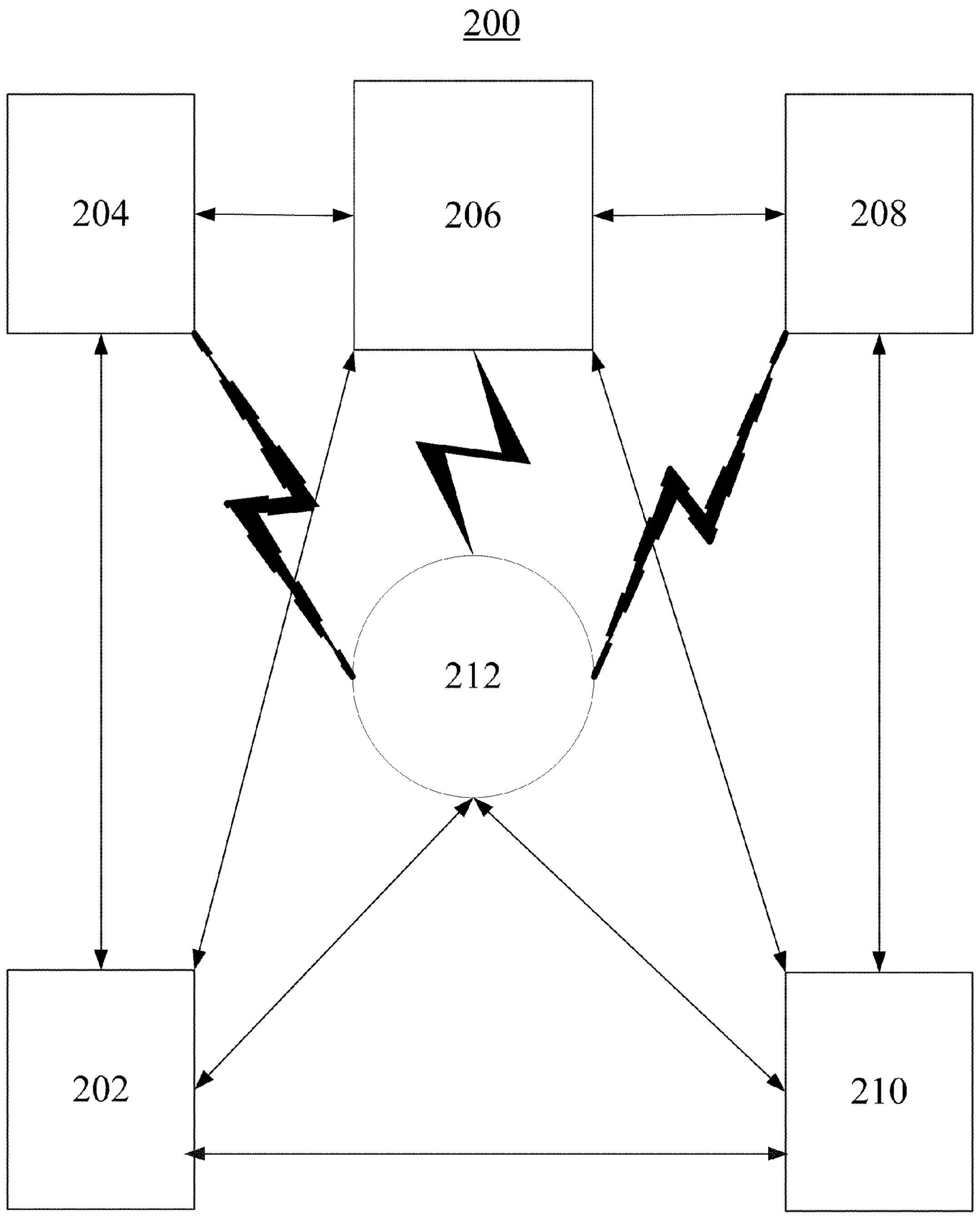
FIGS. 2-3 depict exemplary payment processing systems for processing an acquired transaction conducted on an account issued to consumer with a merchant.

The Payment System illustrated in FIG. 2 depicts an exemplary process in which the extended-functionality portable consumer transaction payment device of the foregoing implementations can be used by a consumer to conduct a transaction with a merchant on the consumer's account.

A transaction includes participation from different entities that are a component of a payment processing system 200 including an issuer 202, a transaction handler 204, such as a credit card company, an acquirer 206, a merchant 208, or a user 210 such as an account holder and/or consumer. The acquirer 206 and the issuer 202 can communicate through the transaction handler 204. Merchant 208 will be a person or entity that sells goods or services. Merchant 208 may utilize at least one Point-of-Service (POS) terminal that can communicate with the acquirer 206, the transaction handler 204, or the issuer 202. Thus, the POS terminal is in operative communication with the payment processing system 200.

Typically, a transaction begins with the user 210, such as an account holder or a consumer, presenting a extended-functionality portable consumer transaction payment device, seen in FIG. 2 as a Consumer Portable Transaction Payment Device (CPTPD) 212, to merchant 208 to initiate an exchange for a good or service. The CPTPD 212 may include a volatile or non-volatile memory to store information such as the account number or an account holder's name.

Merchant 208 may use the POS terminal to obtain account information, such as an account number, from the portable consumer device. The CPTPD 212 may interface with the POS terminal using a mechanism that may include a contactless system using a radio frequency and/or magnetic field recognition system, but may additionally be adapted for use in a contact system such as by a magnetic stripe reader. The POS terminal sends a transaction authorization request to the issuer 202 of the portable consumer device. Alternatively, or in combination, the CPTPD 212 may communicate with the issuer 202, the transaction handler 204, or the acquirer 206.

The issuer 202 may authorize the transaction using the transaction handler 204. The transaction handler 204 may also clear the transaction. Authorization includes the issuer 202, or the transaction handler 204 on behalf of the issuer 202, authorizing the transaction in connection with the issuer's 202 instructions such as through the use of business rules. The business rules could include instructions or guidelines from the transaction handler 204, the user 210, merchant 208, the acquirer 206, the issuer 202, a financial institution, or combinations thereof. The transaction handler 204 may maintain a log or history of authorized transactions. Once approved, merchant 208 will record the authorization, allowing the user 210 to receive the good or service.

Merchant 208 may, at discrete periods, such as the end of the day, submit a list of authorized transactions to the acquirer 206 or other components of the payment processing system 200. The transaction handler 204 may compare the submitted authorized transaction list with its own log of authorized transactions. If a match is found, the transaction handler 204 may route authorization transaction amount requests from the corresponding acquirer 206 to the corresponding issuer 202 involved in each transaction. Once the acquirer 206 receives the payment of the authorized transaction amount from the issuer 202, it can forward the payment to merchant 208 less any transaction costs, such as fees. If the transaction involves a debit or pre-paid card, the acquirer 206 may choose not to wait for the initial payment prior to paying the merchant 208.

There may be intermittent steps in the foregoing process, some of which may occur simultaneously. For example, the acquirer 206 can initiate the clearing and settling process, which can result in payment to the acquirer 206 for the amount of the transaction. The acquirer 206 may request from the transaction handler 204 that the transaction be cleared and settled. Clearing includes the exchange of financial information between the issuer 202 and the acquirer 206 and settlement includes the exchange of funds. The transaction handler 204 can provide services in connection with settlement of the transaction. The settlement of a transaction includes depositing an amount of the transaction settlement from a settlement house, such as a settlement bank, which the transaction handler 204 typically chooses, into a clearinghouse, such as a clearing bank, that the acquirer 206 typically chooses. The issuer 202 deposits the same from a clearinghouse, such as a clearing bank, which the issuer 202 typically chooses into the settlement house. Thus, a typical transaction involves various entities to request, authorize, and fulfill processing the transaction.

Figure 3:
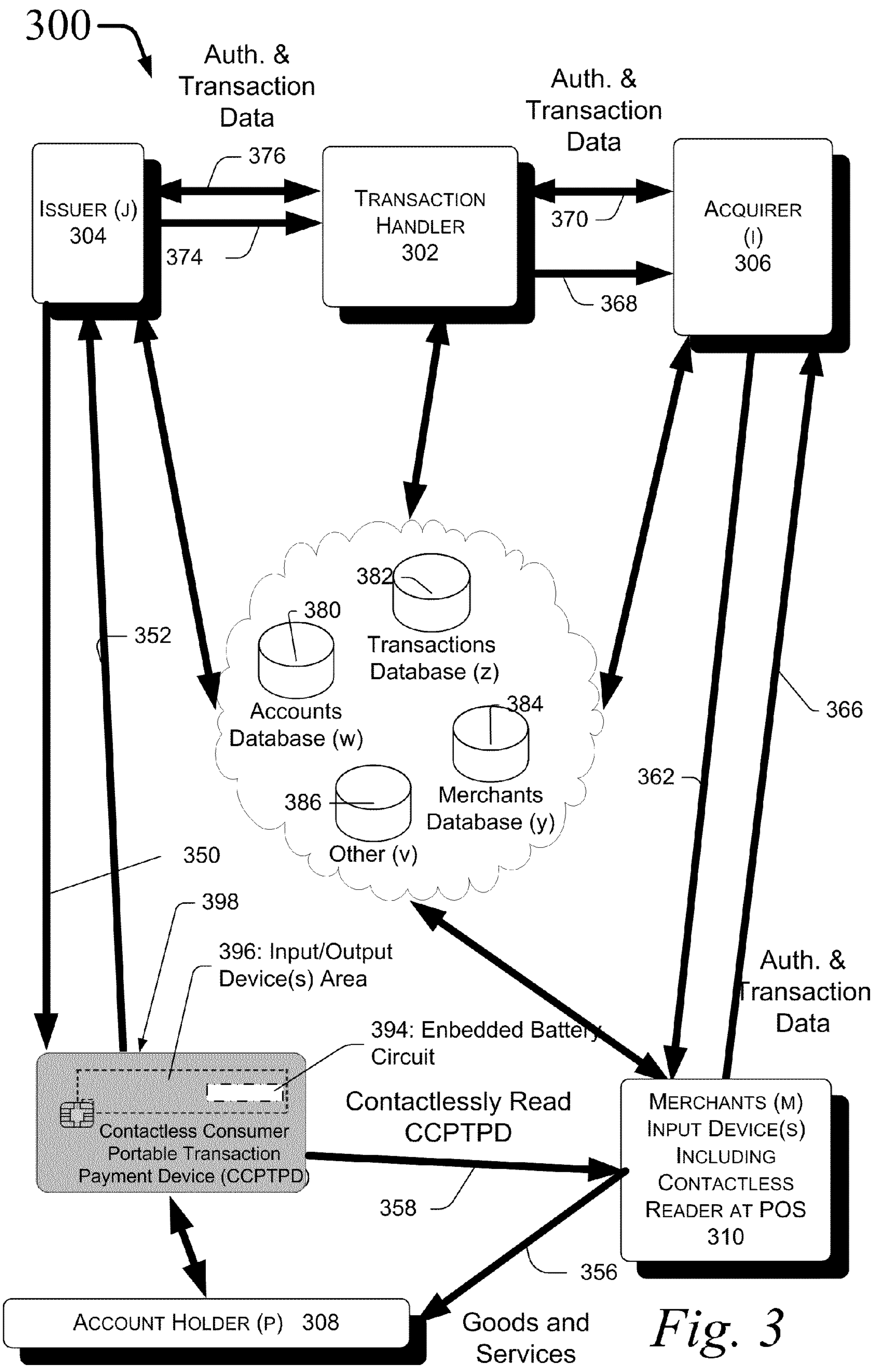

FIG. 3 depicts an exemplary process for the provision of a service by a merchant to a consumer in authorizing and remunerating electronic payment by a account holder (p) 308 in conducting a financial transaction with the merchant using a portable consumer transaction payment device that is an extended-functionality payment card (PCTPD). The diagram of FIG. 3 depicts an exemplary process 300 of a particular financial transaction system. By way of explanation for the nomenclature of reference numerals used in the Figures and described in the specification, a lower case letter in parenthesis is intended to mean an integer variable having a value from 1 to the capital case of the lower case letter, which value can be large (i.e., approaching infinity). Thus '(b)' is intended to mean that the integer 'b' can have a value from 1 to B, and '(c)' is intended to mean that the integer 'c' can have a value from 1 to C, etc. As such, drawing elements 304, 306, 308, 310, 380, 382, and 384 in FIG. 3 are illustrated with a block, but indicate one or more elements can be present. For example, Issuer (j) 304 is one of a possible plurality of issuers, where j may range from 1 to a large integer.

Account holder (p) 308 presents an electronic payment device (i.e.; a credit card) to a Merchant (n) 310 (at step 358) as tender for a financial transaction such as a purchase of goods. Those of skill in the art will recognize that other financial transactions and instruments other than credit cards may also be used, including, but not limited to, a prepaid card and a debit card. For purposes of illustration and explanation, however, reference will be made to a credit card.

As part of the transaction, the Account holder's 308 payment device can be a credit card, debit card, prepaid card, cellular telephone, Personal Digital Assistant (PDA), etc. The payment device is read by a reader operated by the merchant (n) 310, whereupon account information is read from the payment device and a request for authorization is transmitted to the Merchant's 310 Acquirer (i) 306 (at step 362). Each Acquirer (i) 306 is a financial organization that processes credit card transactions for businesses, for example merchants, and is licensed as a member of a transaction handler (TH) 302 such as a credit card association (i.e., Visa Inc., MasterCard, etc.) As such, each Acquirer (i) 306 establishes a financial relationship with one or more Merchants (n) 310.

The Acquirer (i) 306 transmits the account information to the TH 302 (at step 370), who in turn routes the request to the account holder's issuing bank, or Issuer (j) 304 (at step 376). The Issuer (j) 304 returns authorization information to the TH 302 (at step 374) who returns the information to the Merchant (n) 310 through the Acquirer (i) 306 (by steps 368 and 366). The Merchant (n) 310 now knowing whether the Issuer's (j) 304 credit card account is valid and supports a sufficient credit balance, may complete the transaction and the Account holder (p) 308 in turn receives goods and/or services in exchange (at step 356). Most credit card associations instruct merchants that, after receiving authorization, the detailed credit card account information obtained from the point of sale magnetic stripe scanner must be deleted.

To reconcile the financial transactions and provide for remuneration, information about the transaction is provided by the Merchant (n) 310 to Acquirer (i) 306 (at step 362), who in turn routes the transaction data to the TH 302 (at step 370) who then provides the transaction data to the appropriate Issuer (j) 304 (at step 376). The Issuer (j) 304 then provides funding for the transaction to the TH 302 (at step 374) through a settlement bank (not shown). The funds are then forwarded to the Merchant's (n) 310 Acquirer (i) 306 (at step 368) who in turn pays the Merchant (n) 310 for the transaction conducted at step 362 less a merchant discount, if applicable. The Issuer (j) 304, then bills the Account holder (p) 308 (at step 350), and the Account holder (p) 308 pays the Issuer 304 (at step 352), with possible interest or fees.

Each of the Issuer (j) 304, Merchants (n) 310, Acquirer (i) 306 and the TH 302 may have access to information resources having one or more of the following databases: transaction database (z) 382, merchant database (y) 384, or account database (w) 380. These databases can be connected by a network, internet, virtual private network, or by other means known to those skilled in the art. Moreover, not every participant must necessarily have access to any or all of the databases. Each database can assign read, write, and query permissions as appropriate to the various participants. For example, a Merchant (n) 310 have read access to the account database (w) 380 and the Issuer (j) may have read and write access.

The transaction database (z) 382 is designed to store some or all of the transaction data originating at the Merchants (n) 310 that use a payment device for each transaction conducted between an Account holder (p) 308 and the Merchant (n) 310. The transaction data can include information associated with the account of an Account holder (p) 308, date, time, and location among other more specific information including the amount of the transaction. The database can be searched using account information, date and time (or within proximity thereof), or by any other field stored in the database.

The Merchant database (y) 384 is designed to store information about each Merchant (n) 310. The Merchant database (y) can contain information such as the unique identification of each Merchant (n) 310, an identifier for each point of sale device in use by the Merchant (n) 310, and location of the Merchant (n) 310.

The account database (w) 380 is designed to store account information for payment devices associated with Account holder (p). The account database (w) 380 can store part or all of an account number, unique encryption key, account information, account name. The information from the account database (w) 380 can be associated with information from the transaction database (z) 382.

An Account Holder (p) 308 initiates a transaction with a Merchant (n) 310 by presenting a payment device at step 358 to the Merchant (n) 310. The payment device is typically presented at the Point Of Service terminal (POS) at which data thereon is read. Certain transaction information is transmitted from the POS in route to the Merchant's (n) 310 Acquirer (i) 306. The transaction information can include account information, account name, transaction balance, transaction time, transaction date, and transaction location. Sensitive information includes information such account number and account holder name that identify and associate a particular account with a particular account holder. This transaction information may be transmitted via a less secure communication medium. In addition, a transmission of transaction data may occur with weak or no encryption between two or more points from the point of origin, such as the point of sale device at the Merchant (n) 310, and the ultimate destination, such as the Acquirer (i) 306. These points can include, without limitation, from the reader at the POS, the POS at the Merchant (n) 310 and a network router or computer that is connected to a network but is housed and maintained by the Merchant (n) 310 and between the Merchant (n) 310 and the Acquirer (i) 306. The communication channel could be Ethernet, wireless internet, satellite, infrared transmission, or other known communication protocols. Some or all of the transmission may also be stored for record keeping, archival or data mining purposes with little or no encryption. For example, the Merchant (n) 310 may store transaction data, including certain account information in the Merchant's (n) 310 accounts on file database for reuse later.

In this process, transaction information is retrieved from the POS at a Merchant (n) 306. The transaction information is comprised of account information together with other information about the transaction itself: time, date, location, value, etc. Certain of the transaction information is considered sensitive information including, without limitation, account number, credit card verification number, and account name.

Figure 8:
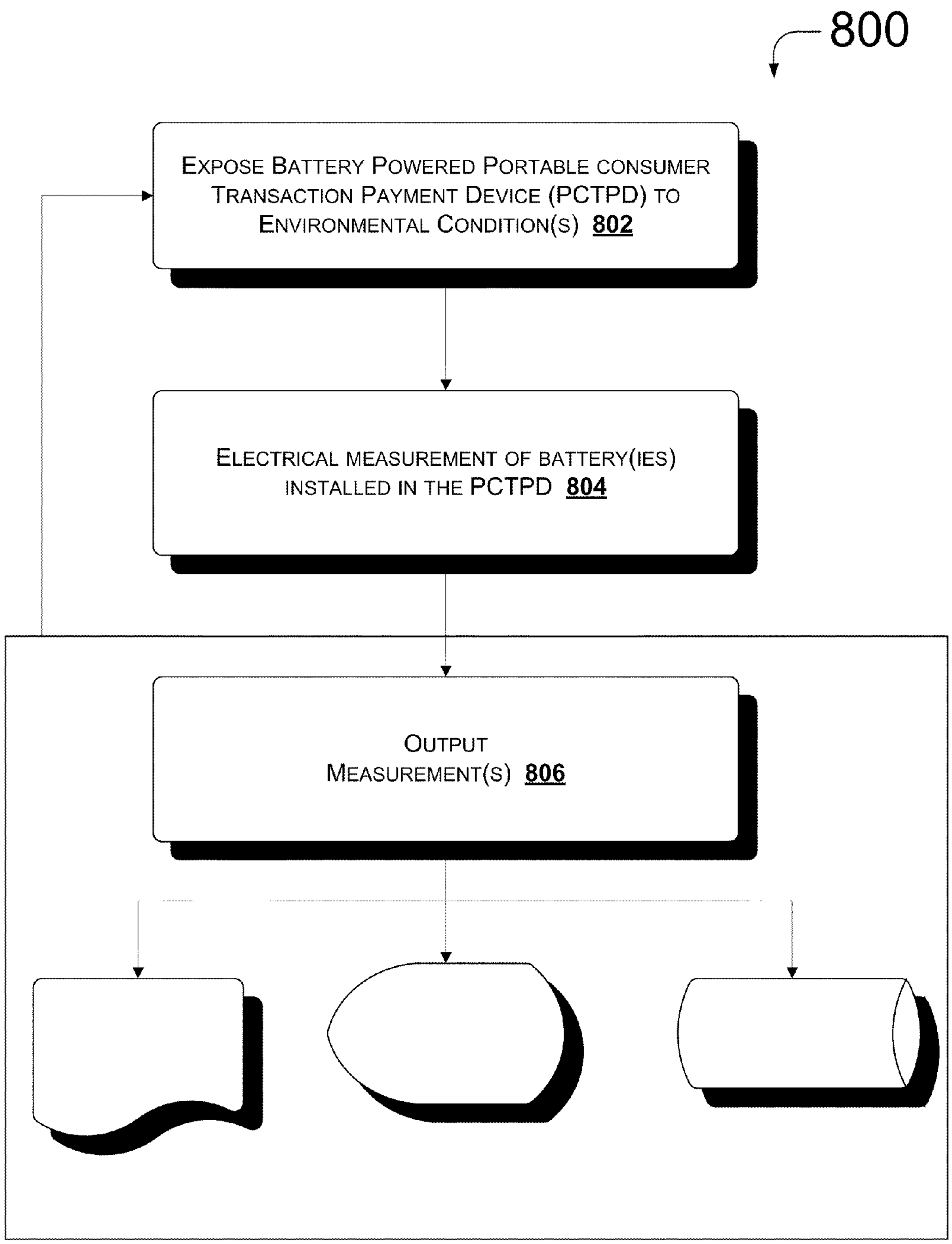
FIG. 8 is a flowchart depicting an exemplary testing process for an extended-functionality payment card.

FIG. 8 is a flowchart depicting an exemplary testing process 800 for an extended-functionality payment card. At step 802, a battery powered portable consumer transaction payment device (PCTPD) is exposed to one or more environmental condition(s). Electrical measurement(s) of battery(ies) installed in the PCTPD, as are disclosed herein, is/are performed at step 804. The measurement(s) are output at step 806 in any of a plurality of different renderings, and the process 800 loops back to step 802.

Various terms may be used herein, which are to be understood according to the following descriptions 1 through 8:

1. Acceptance point device includes a device capable of communicating with a payment device, where the acceptance point device can include a Point of Device (POS) device, a smartcard, a payment card such as a credit or debit card with a magnetic strip and without a microprocessor, a keychain device such as the SPEEDPASS® commercially available from ExxonMobil® Corporation, a cellular phone, personal digital assistant (PDA), a pager, a security card, an access card, a smart media, a transponder, personal computer (PC), tablet PC, handheld specialized reader, set-top box, electronic cash register (ECR), automated teller machine (ATM), virtual cash register (VCR), kiosk, security system, or access system;

2. Account holder or user includes any person or entity with an account and/or a payment device associated with an account, where the account is within a payment system;

3. Issuer includes any entity that issues one or more accounts and/or payment devices;

4. Merchant includes any entity that supports an acceptance point device;

5. Participant includes any user, person, entity, charitable organization, machine, hardware, software, merchant or business who accesses and uses the system of the invention, such as any consumer (such as primary member and supplementary member of an aggregate consumer account), retailer, manufacturer, and third-party provider, and any subset, group or combination thereof;

6. Redemption includes obtaining a reward using any portion of points, coupons, cash, foreign currency, gift, negotiable instruments, or securities;

7. Reward includes any discount, credit, good, service, package, event, experience (such as wine tasting, dining, travel), or any other item; and 8. Payment device includes a card, smartcard, ordinary credit or debit cards (with a magnetic strip and without a microprocessor), a keychain device (such as the SPEEDPASS™ commercially available from Exxon-Mobil Corporation), cellular phone, personal digital assistant (PDA), pager, payment card, security card, access card, smart media, or transponder, where each payment device can include a loyalty module with a computer chip with dedicated hardware, software, embedded software, or any combination thereof that is used to perform actions associated with a loyalty program.

All references, including publications, patent applications, and patents, cited herein are hereby incorporated by reference to the same extent as if each reference were individually and specifically indicated to be incorporated by reference and were set forth in its entirety herein.

The uses of individual numerical values are stated as approximations as though the values were preceded by the word "about" or "approximately." Similarly, the numerical values in the various ranges specified in this application, unless expressly indicated otherwise, are stated as approximations as though the minimum and maximum values within the stated ranges were both preceded by the word "about" or "approximately." In this manner, variations above and below the stated ranges can be used to achieve substantially the same results as values within the ranges. As used herein, the terms "about" and "approximately" when referring to a numerical value shall have their plain and ordinary meanings to a person of ordinary skill in the art to which the particular subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about" or "approximately" will serve to broaden a particular numerical value. Thus, as a general matter, "about" or "approximately" broaden the numerical value. Also, the disclosure of ranges is intended as a continuous range including every value between the minimum and maximum values plus the broadening of the range afforded by the use of the term "about" or "approximately." Thus, recitation of ranges of values herein are merely intended to serve as a shorthand method of referring individually to each separate value falling within the range, unless otherwise indicated herein, and each separate value is incorporated into the specification as if it there individually recited herein.

It is to be understood that any ranges, ratios and ranges of ratios that can be formed by, or derived from, any of the data disclosed herein represent further implementations of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

The use of the terms "a" and "an" and "the" and similar referents in the context of this disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., such as, preferred, preferably) provided herein, is intended merely to further illustrate the content of the disclosure and does not pose a limitation on the scope of the claims. No language in the specification should be construed as indicating any non-claimed element as essential to the practice of the claimed invention.

Use of the phrase 'the invention' or 'the present invention' is not meant to limit the claims in any manner and no conclusion should be drawn that any description or argument associated with a particular use of the phrase 'the invention' or 'the present invention' applies to each and every claim. The use of the phrase 'the invention' or 'the present invention' has been used solely for linguistic or grammatical convenience and not to effect a limitation of any nature on any of the claims.

Alternative implementations invention are described herein, including the best mode known to the inventors for carrying out the claimed invention. Of these, variations of the disclosed implementations will become apparent to those of ordinary skill in the art upon reading the foregoing disclosure. The inventors expect skilled artisans to employ such variations as appropriate, and the inventors intend for the claimed invention to be practiced otherwise than as specifically described herein. Accordingly, the claimed invention includes all modifications and equivalents of the subject matter recited in the claims appended hereto as permitted by applicable law. Moreover, any combination of the above-described elements in all possible variations thereof is encompassed by the claimed invention unless otherwise indicated herein or otherwise clearly contradicted by context.

While the present invention may be embodied in many different forms, several specific embodiments are discussed herein with the understanding that the present disclosure is to be considered only as an exemplification of the principles of the invention, and it is not intended to limit the invention to the embodiments illustrated.

What is claimed is:

1. A method comprising:

providing a portable consumer transaction payment device (PCTPD) having:

a substrate with opposing surfaces;

memory, in contact with the substrate, storing data that includes an identifier for an account issued by an issuer to an account holder for use of the PCTPD to conduct a transaction on the account to make a purchase from a merchant;

a battery powered circuit having one or more batteries installed in a compartment within the PCTPD; and an electronic component, in contact with the substrate, powered by the battery powered circuit;

making an electrical measurement of the one or more batteries, when the one or more batteries are installed in the compartment within the PCTPD, at each of a plurality of different times when the PCTPD is exposed to different predetermined environmental test conditions, wherein the predetermined environmental test conditions include:

a substantial vacuum condition, for a predetermined time, applied to the PCTPD, a predetermined temperature for a predetermined time period, and a predetermined motion for a predetermined time; and outputting each said electrical measurement.

2. The method as defined in claim 1, wherein the predetermined environmental test conditions further include at least one of:

a current pulse applied at each of a plurality of different states of charge of the one or more batteries;

a substantial acceleration, for a predetermined time, of the PCTPD;

a substantial vibration, for a predetermined time, of the PCTPD; and a substantial deceleration of the PCTPD.

3. The method as defined in claim 1, wherein the electronic component is selected from the group consisting of:

an output device;

an input device;

a solar power supply circuit for charging the one or more batteries;

a processor; and a combination of the foregoing.

4. The method as defined in claim 1, wherein the electronic component is an output device selected from the group consisting of:

a light;

a display screen;

an audio rendering device; and a combination of the foregoing.

5. The method as defined in claim 1, wherein the electronic component is an input device selected from the group consisting of:

an activation button to manually input data to the PCTPD;

a biometric input device; and a combination of the foregoing.

6. The method as defined in claim 1, wherein the PCTPD is a transaction payment card having a magstripe encoding the data that includes the identifier for the account.

7. The method as defined in claim 1, wherein the PCTPD is a transaction payment card having a chip.

8. The method as defined in claim 7, wherein the chip is powered by the battery powered circuit.

9. A method comprising:

providing a portable consumer transaction payment device (PCTPD) having:

a substrate with opposing surfaces;

memory, in contact with the substrate, storing data that includes an identifier for an account issued by an issuer to an account holder for use of the PCTPD to conduct a transaction on the account to make a purchase from a merchant;

a battery powered circuit having one or more batteries installed in a compartment within the PCTPD;

a display screen on the substrate and powered by the battery powered circuit; and a processor, powered by the battery powered circuit, and executing firmware to output information for display by rendering on the display screen;

making an electrical measurement of the one or more batteries, when the one or more batteries are installed in the compartment within the PCTPD, at each of a plurality of different times when the PCTPD is exposed to different predetermined environmental test conditions, wherein the predetermined environmental test conditions include:

a predetermined temperature for a predetermined time period;

a substantial vacuum condition, for a predetermined time, applied to the PCTPD;

a current pulse applied at each of a plurality of different states of charge of the one or more batteries;

a substantial vibration, for a predetermined time, of the PCTPD; and at least one of:

a substantial acceleration, for a predetermined time, of the PCTPD; and a substantial deceleration of the PCTPD;

and outputting each said electrical measurement.

10. The method as defined in claim 9, wherein the PCTPD further comprises an input device for receiving data to be processed by the processor.

11. The method as defined in claim 10, wherein input device is selected from the group consisting of:

an activation button to manually input data to the PCTPD;

a biometric input device; and a combination of the foregoing.

12. The method as defined in claim 9, wherein the PCTPD is a transaction payment card having a magstripe encoding the data that includes the identifier for the account.

13. The method as defined in claim 9, wherein the PCTPD is a transaction payment card having a chip.

14. The method as defined in claim 13, wherein the chip is powered by the battery powered circuit.

15. A method comprising:

providing a portable consumer transaction payment device (PCTPD) having:

a substrate with opposing surfaces;

memory, in contact with the substrate, storing data that includes an identifier for an account issued by an issuer to an account holder for use of the PCTPD to conduct a transaction on the account to make a purchase from a merchant;

a battery powered circuit having:
one or more batteries;
at least partially situated between the opposing surfaces of the substrate; and
battery terminals in electrical communication with the one or more batteries;
and
an electronic component, in contact with the substrate, powered by the battery powered circuit;
making a plurality of measurements that include:
a battery capacity measurement, at the battery terminals, of the battery capacity of the one or more batteries at:
each of a plurality of temperatures; and
each said temperature, a plurality of different times at a respectively plurality of different currents;
a pulse power capability measurement, at the battery terminals, of the one or more batteries while applying a current pulse at each of a plurality of different states of charge of the one or more batteries;
an open-circuit voltage value, at the battery terminals, of the one or more batteries before and after:
applying an substantial acceleration, for a predetermined time, to the PCTPD;
applying a vibration, for a predetermined time, to the PCTPD;
dropping the PCTPD from a predetermined distance to a hard surface at each of plurality of times;
exposing the PCTPD to different predetermined temperatures for different exposure time lengths; and
exposing the PCTPD to a pressure that is substantially a vacuum for a predetermined period of time;
a measurement for a prediction of a shelf life of the one or more batteries as a function of time and capacitance by:
making assessments of the battery capacity, at the battery terminals, of the one or more batteries at the end of each of a plurality of times during which the PCTPD was exposed to a different fixed temperature; and
deriving, using the assessments of the battery capacity, the prediction of the shelf life of the one or more batteries as a function of time and capacitance;
a measurement, periodically, of voltage and current as a function of time, at the battery terminals, of the one or more batteries as the one or more batteries are:
discharged at a constant temperature and at a constant rate using a constant-current load; and
discharged when a short-circuit is connected at the battery terminals;
and
a measurement, periodically, of the temperature of the one or more batteries and of the voltage, at the battery terminals, of the one or more batteries as pressure is applied to the PCTPD so as to dent the substrate proximal the one or more batteries;
and
outputting each said measurement.

16. The method as defined in claim 15, wherein the electronic component is selected from the group consisting of:
an output device;
an input device;
a solar power supply circuit for charging the one or more batteries;
a processor; and
a combination of the foregoing.

17. The method as defined in claim 15, wherein the electronic component is an output device selected from the group consisting of:
a light;
a display screen;
an audio rendering device; and
a combination of the foregoing.

18. The method as defined in claim 15, wherein the electronic component is an input device selected from the group consisting of:
an activation button to manually input data to the PCTPD;
a biometric input device; and
a combination of the foregoing.

19. The method as defined in claim 15, wherein the PCTPD is a transaction payment card having a magstripe encoding the data that includes the identifier for the account.

20. The method as defined in claim 15, wherein the PCTPD is a transaction payment card having a chip.

* * * * *